(12) United States Patent
Gustafson et al.

(10) Patent No.: US 12,509,303 B2
(45) Date of Patent: Dec. 30, 2025

(54) APPARATUS FOR MOVING ITEMS ALONG A RAIL

(71) Applicant: Kannegiesser North America, Inc., Minneapolis, MN (US)

(72) Inventors: Chris Orm Gustafson, Minneapolis, MN (US); Darik Dwaine Lamke, Minnetonka, MN (US)

(73) Assignee: Kannegiesser North America, Inc., Minneapolis, MN (US)

( * ) Notice: Subject to any disclaimer, the term of this patent is extended or adjusted under 35 U.S.C. 154(b) by 888 days.

(21) Appl. No.: 17/618,622

(22) PCT Filed: Jun. 12, 2020

(86) PCT No.: PCT/US2020/037505
§ 371 (c)(1),
(2) Date: Dec. 13, 2021

(87) PCT Pub. No.: WO2020/252318
PCT Pub. Date: Dec. 17, 2020

(65) Prior Publication Data
US 2022/0242673 A1 Aug. 4, 2022

Related U.S. Application Data

(60) Provisional application No. 62/861,564, filed on Jun. 14, 2019.

(51) Int. Cl.
*B65G 25/08* (2006.01)
*B61B 13/00* (2006.01)
(Continued)

(52) U.S. Cl.
CPC .............. *B65G 25/08* (2013.01); *B61B 13/00* (2013.01); *B65G 9/008* (2013.01); *B65G 47/61* (2013.01)

(58) Field of Classification Search
CPC ......... B65G 25/08; B65G 9/008; B65G 47/61
See application file for complete search history.

(56) References Cited

U.S. PATENT DOCUMENTS 3,338,179 A * 8/1967 Klemm ................. B61B 10/025
101/112
3,800,709 A * 4/1974 De Good .............. B61B 10/025
104/172.4
(Continued)

FOREIGN PATENT DOCUMENTS

CN 111573170 B * 8/2024 ............ B65G 25/08
DE 10236449 2/2004
(Continued)

OTHER PUBLICATIONS

"European Application Serial No. 20822341.2, Extended European Search Report mailed Jul. 19, 2022", 8 pgs.
(Continued)

*Primary Examiner* — Jason C Smith
(74) *Attorney, Agent, or Firm* — Schwegman Lundberg & Woessner, P.A.

(57) ABSTRACT

An apparatus may move a carriage along a rail. The apparatus may include a frame and one or more sets of teeth. A shuttle may translate with respect to the frame. The shuttle may engage with the carriage to translate the carriage in a first direction. The teeth may extend into a carriage recess of the frame. The teeth may allow the carriage to translate within the carriage recess in the first direction. The teeth may inhibit the translation of the carriage within the carriage recess in a second direction.

15 Claims, 15 Drawing Sheets

(51) Int. Cl.
*B65G 9/00* (2006.01)
*B65G 47/61* (2006.01)

(56) References Cited

U.S. PATENT DOCUMENTS

| | | | | |
|---|---|---|---|---|
| 4,148,261 | A * | 4/1979 | Wakabayashi | B61B 10/025 104/103 |
| 5,103,737 | A * | 4/1992 | Iwase | B65G 19/025 198/360 |
| 5,361,890 | A * | 11/1994 | McDonald | B65G 17/20 198/465.4 |
| 5,580,206 | A * | 12/1996 | Redelman | B66F 9/07 414/807 |
| 9,828,179 | B2 * | 11/2017 | Prüssmeier | B65G 9/008 |
| 10,703,568 | B2 * | 7/2020 | Stauber | B65G 9/002 |
| 10,773,888 | B2 * | 9/2020 | Schurba | B61B 3/02 |
| 11,325,781 | B2 * | 5/2022 | Zhu | B65G 1/0492 |
| 11,945,665 | B1 * | 4/2024 | Lais | B65G 54/02 |
| 2006/0070850 | A1 * | 4/2006 | Hartness | B65G 47/5104 198/468.2 |
| 2017/0225693 | A1 * | 8/2017 | Fenile | B65G 9/008 |
| 2022/0242673 | A1 * | 8/2022 | Gustafson | B65G 47/61 |

FOREIGN PATENT DOCUMENTS

| | | | |
|---|---|---|---|
| DE | 102018111759 | 5/2019 | |
| GB | 2124989 | 2/1984 | |
| WO | WO-2018055241 A1 * | 3/2018 | ............ B05B 13/02 |
| WO | WO-2020252318 A1 | 12/2020 | |

OTHER PUBLICATIONS

"International Application Serial No. PCT US2020 037505, International Preliminary Report on Patentability mailed Dec. 23, 2021", 6 pgs.

"International Application Serial No. PCT/US2020/037505, International Search Report mailed Oct. 22, 2020", 4 pgs.

"International Application Serial No. PCT/US2020/037505, Invitation to Pay Additional Fees mailed Aug. 31, 2020", 2 pgs.

"International Application Serial No. PCT/US2020/037505, Written Opinion mailed Oct. 22, 2020", 4 pgs.

"European Application Serial No. 20822341.2, Response Filed Feb. 14, 2023 to Extended European Search Report mailed Jul. 19, 2022", 10 pgs.

* cited by examiner

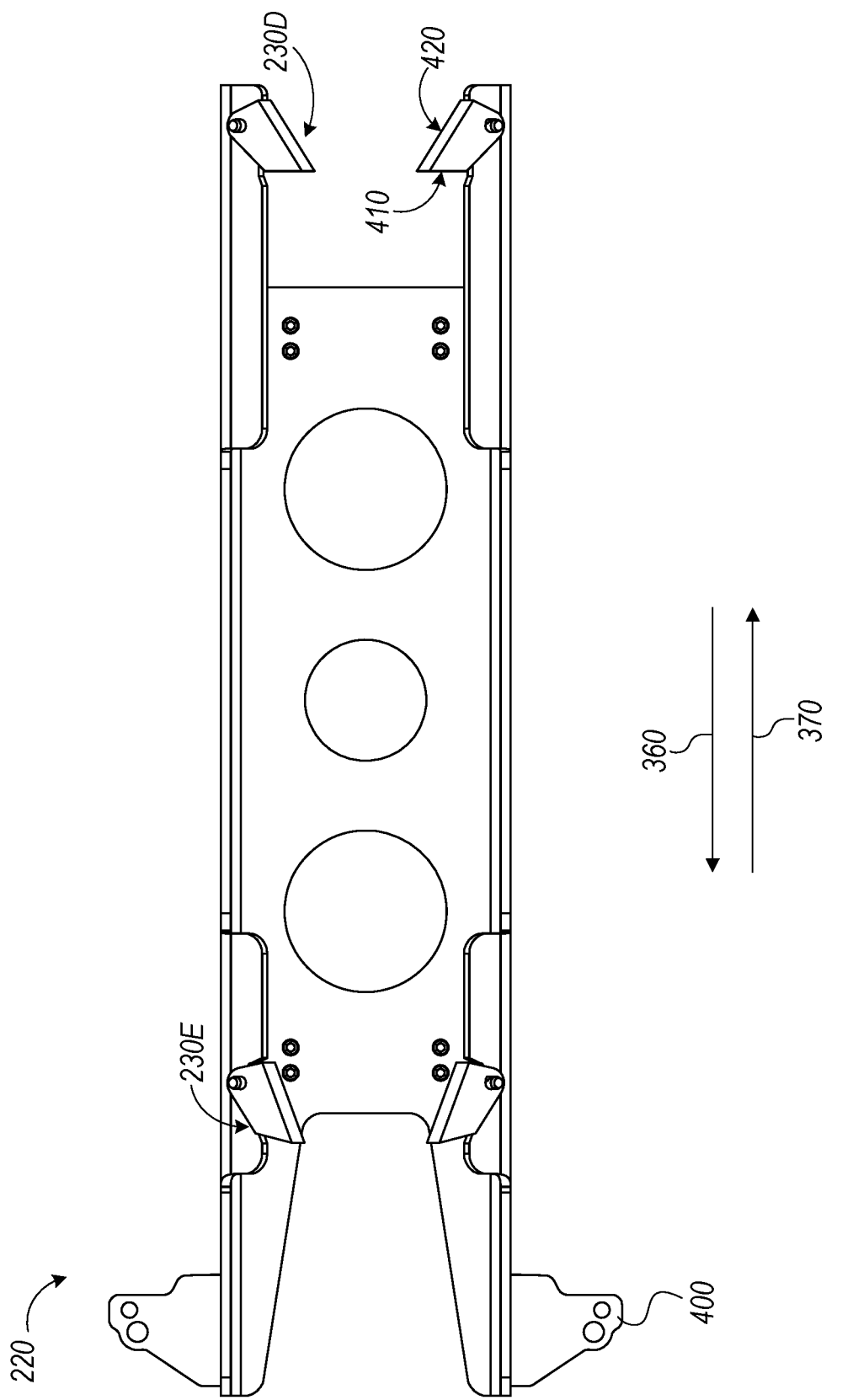

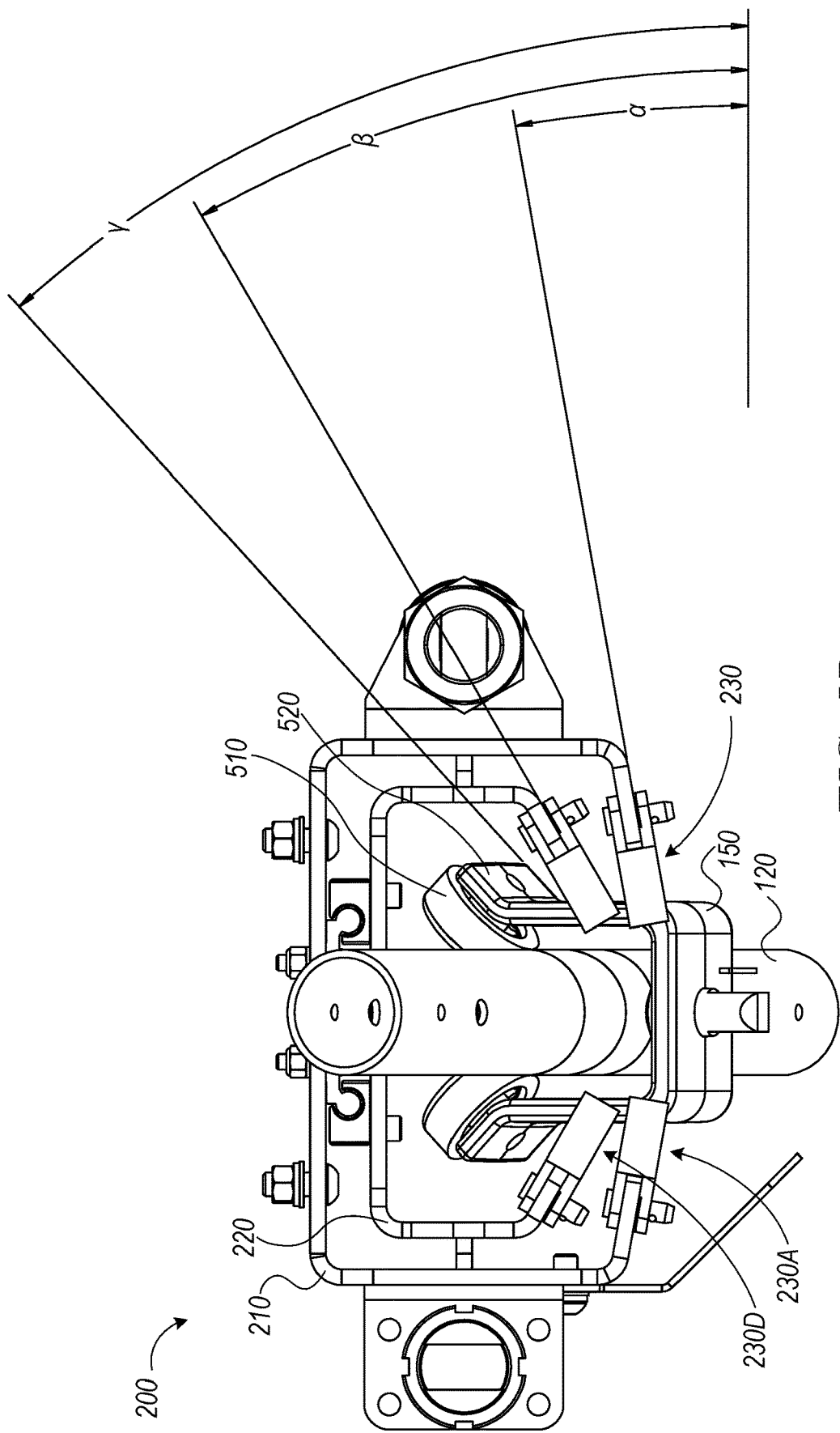

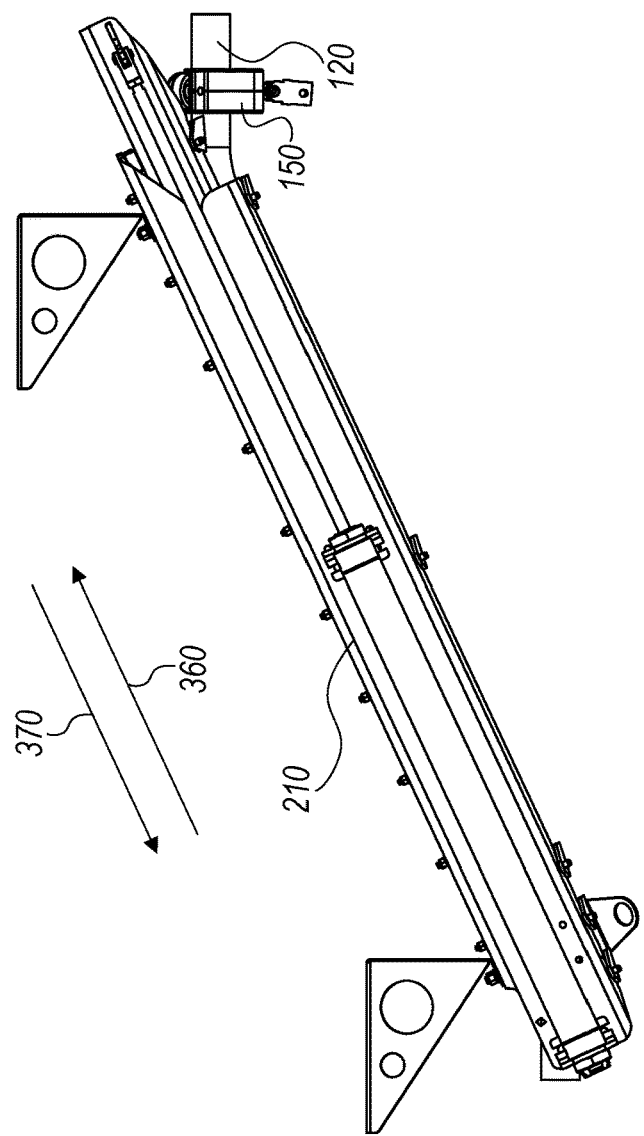
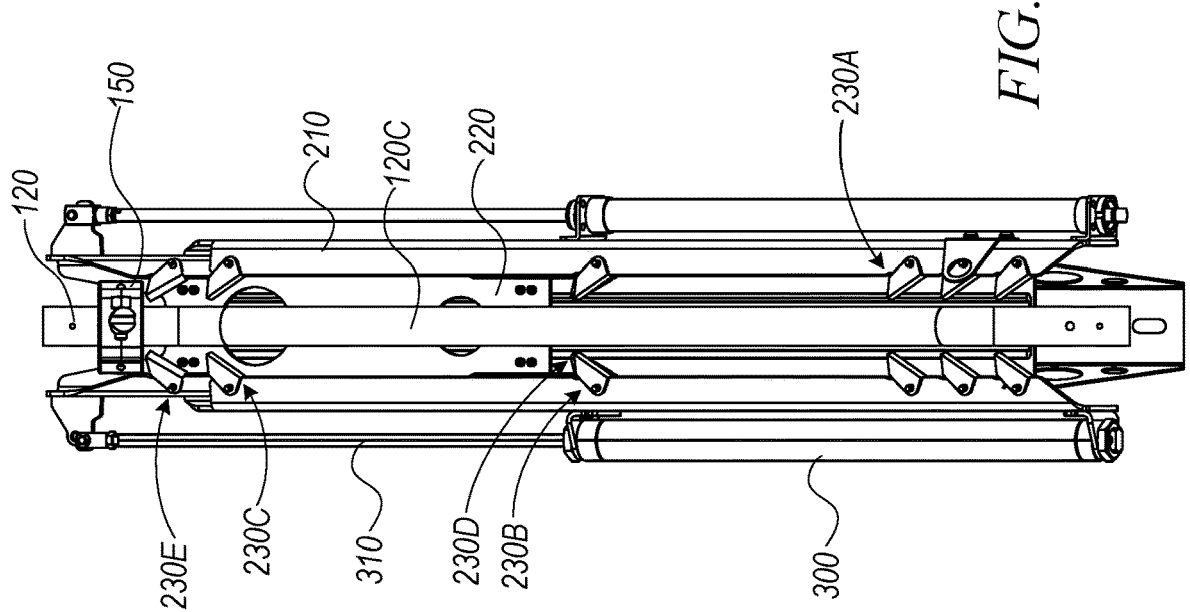
FIG. 11B
FIG. 11A

APPARATUS FOR MOVING ITEMS ALONG A RAIL

CLAIM OF PRIORITY

This patent application is a U.S. National Stage Application under 35 U.S.C. 371 from International Application No. PCT/US2020/037505, filed Jun. 12, 2020, and published as WO 2020/252318 on Dec. 17, 2020, which claims the benefit of U.S. Provisional Patent Application Ser. No. 62/861,564, entitled "APPARATUS FOR MOVING ITEMS ALONG A RAIL," filed on Jun. 14, 2019, which are hereby incorporated by reference in their entirety.

BACKGROUND

Laundry (e.g., clothes, bedding, linens, towels, or the like) may be cleaned (e.g., washed, sanitized, or the like). An establishment (e.g., a restaurant, hospital, hotel, or the like) may generate large amounts of laundry that may be cleaned. The laundry may be loaded into a container (e.g., a hamper, basket, sack, bag), and the container may be moved to convey the laundry from one location to another location.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates a bottom view of an example of a shuttle for the lift apparatus of FIG. 2 according to one embodiment of the present subject matter.

FIG. 5B illustrates another end view of an example of the carriage transporting apparatus of FIG. 2 according to one embodiment of the present subject matter.

FIG. 11A and FIG. 11B illustrate bottom and side views respectively of an example of the carriage transporting apparatus in a fourth configuration according to one embodiment of the present subject matter.

DETAILED DESCRIPTION

Figure 1:
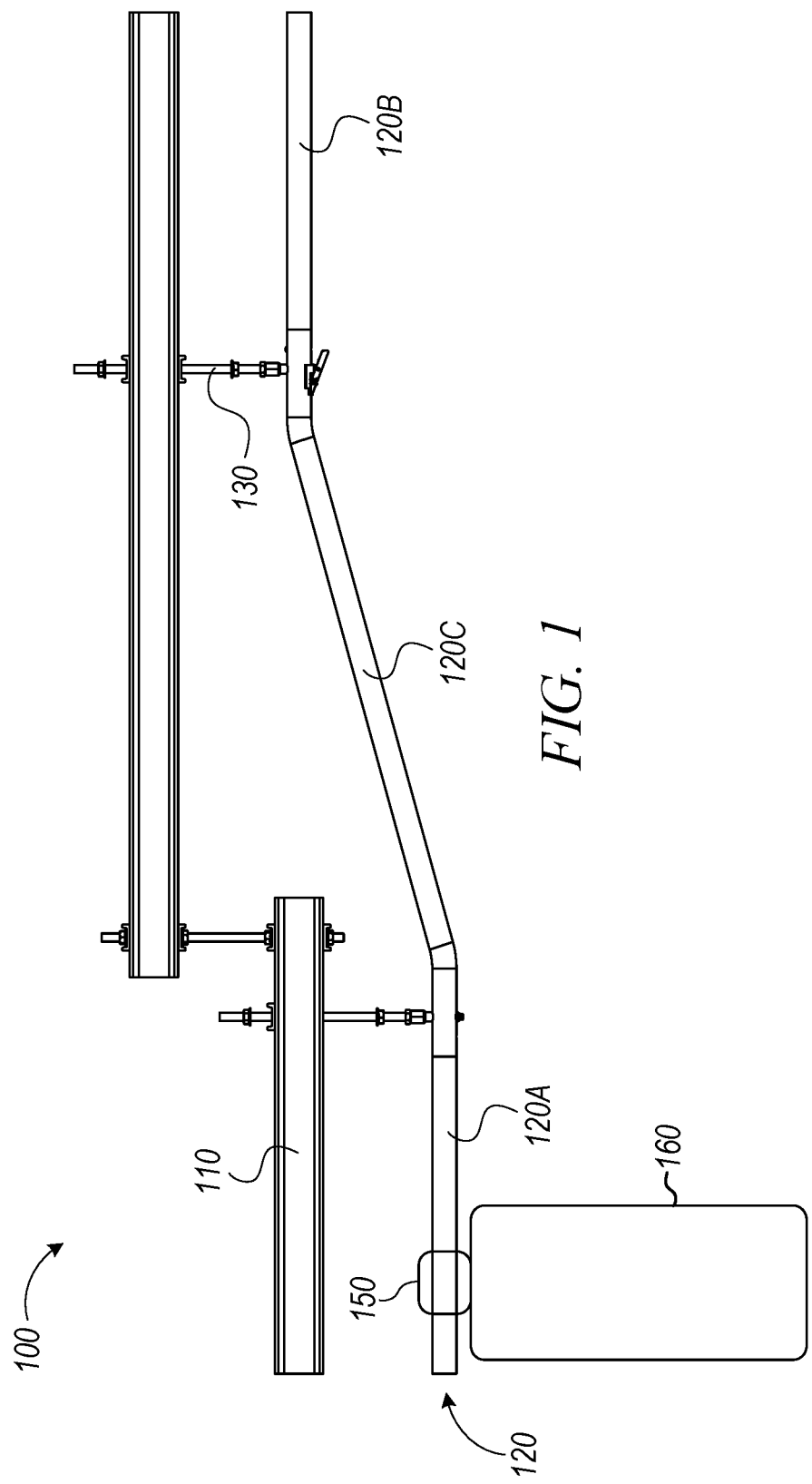
FIG. 1 illustrates a side view of an example of a rail system for conveying items according to one embodiment of the present subject matter.

The present inventors have recognized, among other things, that a problem to be solved may include moving items (e.g., textiles, merchandise, products, or the like) in a space (e.g., a warehouse, shop-floor, manufacturing facility, shipping dock, port, or the like). Such problems may be solved, for example with a rail system may be located in the space. The rail system may include at least one rail, and the rail may be suspended from a ceiling of the space. The rail may me supported by the floor of the building.

A carriage may move (e.g., roll, slide, convey, translate) along the rail. For instance, the carriage may include one or more wheels that roll along the rail. The carriage may support a container (e.g., a hamper, basket, sack, bag, box, sling) that may move with the carriage along the rail. The container may hold textiles, and the textiles may move with the container and the carriage along the rail. For example, a container holding laundry may hang from the carriage and the laundry may be moved with the rail system through a laundry facility that cleans the laundry. The carriage may move along the rail with the assistance of gravity, or a force may be applied to the carriage to move the carriage along the rail.

The rail system may have a varying elevation. For example, a first section of the rail may be located at a first elevation and a second section of the rail may be located at a second elevation. The rail system may include a bend, dog-leg, saddle, or the like. Accordingly, the first section of the rail may be offset (e.g., vertically offset, horizontally offset, offset at an angle) from the second section of the rail. A transition section of the rail may be located between the first (e.g., lower) section and the second (e.g., upper) section, and the transition section may provide a rail section that offsets between the first section and the second section. The transition section may interlink the first section and the second section, and the transition section may allow the rail to be continuous between the first section and the second section. The sections (e.g., the first section and the transition section) may be separate pieces, and the separate pieces of the rail may be assembled together to provide a continuous rail.

The present inventors have recognized, among other things, that a problem to be solved may include moving a carriage along a rail. Such problems may be solved with carriage transporting apparatus, and the apparatus may help move the carriage along the rail. For example, the carriage transporting apparatus may help move the carriage between the first section of rail and the second section of rail. For instance, the carriage transporting apparatus may help lift the carriage through the transition section of the rail.

The carriage transporting apparatus may include a frame. The frame may include a first set of teeth and may include a second set of teeth. The apparatus may include a shuttle configured to translate with respect to the frame. The shuttle may include a third set of teeth, and the third set of teeth may engage with the carriage. The shuttle may help translate (e.g., move, push, pull, rotate, slide, shift, oscillate, reciprocate, or the like) the carriage in a first direction, for instance when the carriage is engaged with the third set of teeth and the shuttle is translated in the first direction. The carriage may help move a container that holds textiles. The first set of teeth, the second set of teeth, and the third set of teeth may engage with the carriage to inhibit the translation of the carriage in a second direction.

FIG. 1 illustrates a side view of an example of a rail system 100 for moving items according to one embodiment of the present subject matter. The rail system may include at a support member 110. The support member 110 may be coupled to a structure (e.g., a roof truss, beam, stud, wall, floor, ground, or the like). A rail 120 may be coupled to the support member 110, and the support member 110 may facilitate coupling the rail 120 with the structure. For instance, the rail 120 may be suspended from (e.g., hung from, resting upon, or the like) the support member 110 with a fastener 130 (e.g., a threaded rod, a post, etc.). The rail 120 may have a circular, oval, square, rectangular, polygonal, or irregular (e.g., T-shaped, S-shaped) profile.

A carriage 150 may move along the rail 120, and the rail system may facilitate transportation of the carriage 150. The carriage 150 may support a container 160, and the container 160 may move with the carriage 150 along the rail 120. The container 160 may be suspended from the carriage 150. The container 160 may hold textiles, and the textiles may move with the container 160 and the carriage 150 along the rail 120. For example, the container 160 may hold items, such as laundry (e.g., bed sheets, towels, rugs, or the like). The container 160 may hang from the carriage 150 and the laundry may be moved with the rail system 100 through a laundry facility that cleans the laundry. The container 160 may have an opening (e.g., an open top) that facilitates inserting items into the container 160. The carriage 150 may move along the rail 120 with the assistance of gravity, or a force may be applied to the carriage 150 to move the carriage 150 along the rail 120.

The rail system 100 may have a varying elevation. For example, a first section 120A of the rail 120 may be located at a first elevation and a second section 120B of the rail 120B may be located at a second elevation.

The rail system 100 may include a bend, dog-leg, saddle, or the like. Accordingly, the first section 120A of the rail may be offset from the second section of the rail 120. A transition section 120C of the rail 120 may be located between the first section 120A and the second section 120B. The transition section 120C may provide a rail 120 section that offsets between the first section 120A and the second section 120B. The transition section 120C may interlink the first section 120A and the second section 120B, and the transition section 120C may allow the rail 120 to be continuous between the first section 120A and the second section 120B. The sections (e.g., the first section 120A and the transition section 120C) may be separate pieces, and the separate pieces of the rail 120 may be assembled together to provide a continuous rail 120. In various embodiments, the transition section is positioned at an angle with respect to level. In various embodiments an angle of 15 degrees is used to make the transition. In various embodiments an angle of 20 degrees is used to make the transition. In various embodiments an angle of 25 degrees is used to make the transition. In various embodiments an angle of 30 degrees is used to make the transition. In various embodiments an angle of 35 degrees is used to make the transition. In various embodiments an angle of 40 degrees is used to make the transition. In various embodiments an angle of 45 degrees is used to make the transition. These and other angles may be used depending on the application, the mechanism for driving the carriage, and the rail used.

Figure 2:
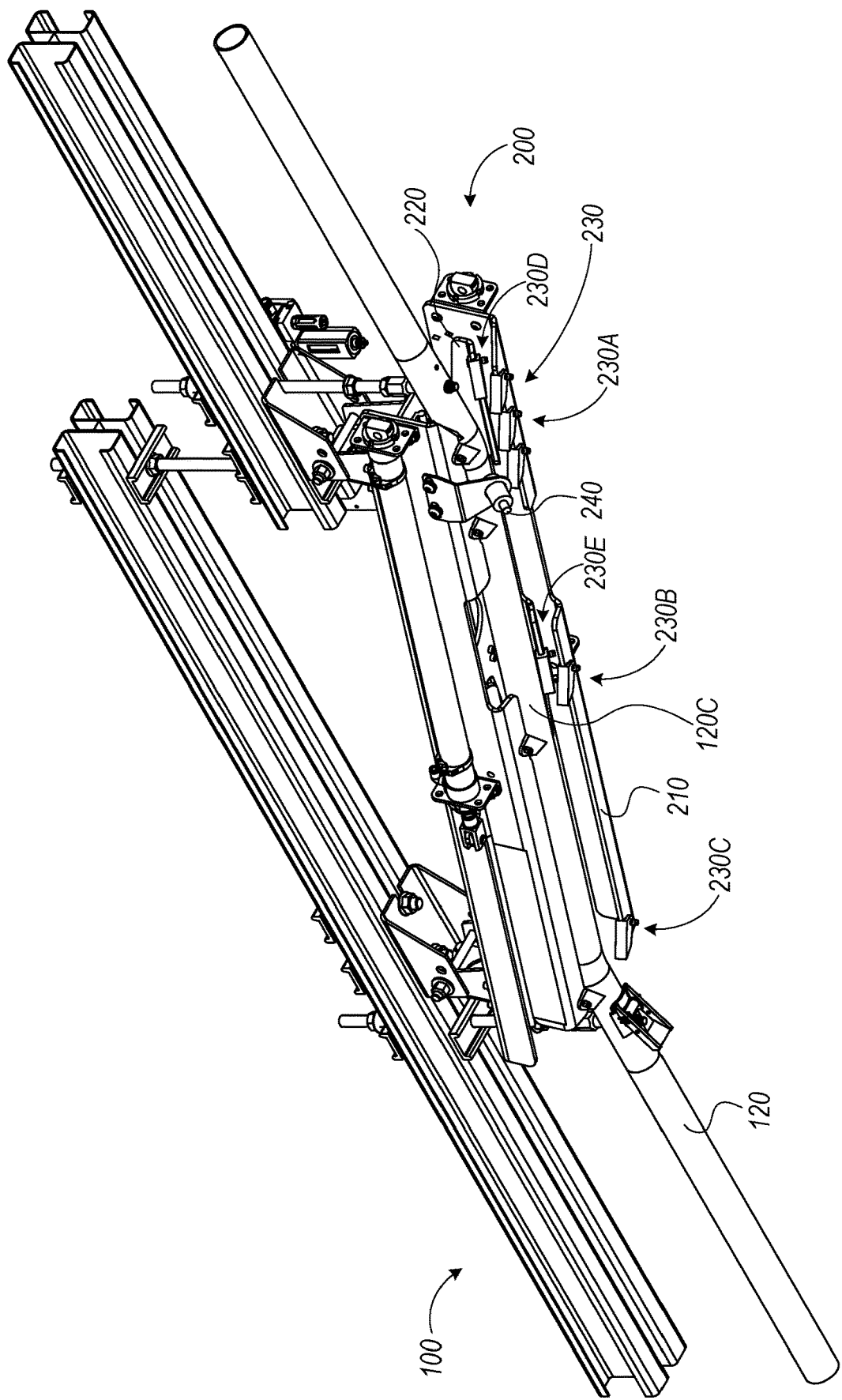
FIG. 2 illustrates a perspective view of an example of a carriage transporting apparatus and the rail system of FIG. 1 according to one embodiment of the present subject matter.

FIG. 2 illustrates a perspective view of an example of a carriage transporting apparatus 200 and the rail system 100 of FIG. 1 according to one embodiment of the present subject matter. The carriage transporting apparatus 200 may help move the carriage 150 (e.g., as shown in FIG. 1) along the rail 120. The apparatus 200 may engage with the carriage 150 to move the carriage 150 along the rail 120. For example, the apparatus 200 may help move (e.g., lift, push, pull, translate, or the like) the carriage 150 through the transition section 120C of the rail 120.

The carriage transporting apparatus 200 may include a frame 210. The frame 210 may support one or more components of the apparatus 200. For instance, a shuttle 220 may be moveably coupled to the frame 210, and the shuttle 220 may translate (e.g., move, push, pull, rotate, slide, shift, oscillate, reciprocate, or the like) with respect to the frame 210.

One or more sets of teeth 230 may be included in the carriage transporting apparatus 200. For example, a first set of teeth 230A and a second set of teeth 230B may be coupled to the frame 210. A third set of teeth 230C may be coupled to the frame 210. The teeth 230 may be located on opposing sides of the frame 210. In some examples, the third set of teeth 230C may include multiple pairs of teeth 230. The teeth 230 may engage with the carriage 150 (e.g., as shown in FIG. 1) to help move the carriage 150 along the rail 120, for instance in a first direction. The teeth 230 may inhibit the movement of the carriage 150 with respect to the frame 210, for instance in a second direction. Accordingly, the carriage transporting apparatus 200 may help move items along the rail system 100, for example when the teeth 230 are engaged with the carriage 150 and the shuttle 220 is translated with respect to the frame 210.

Figure 3:
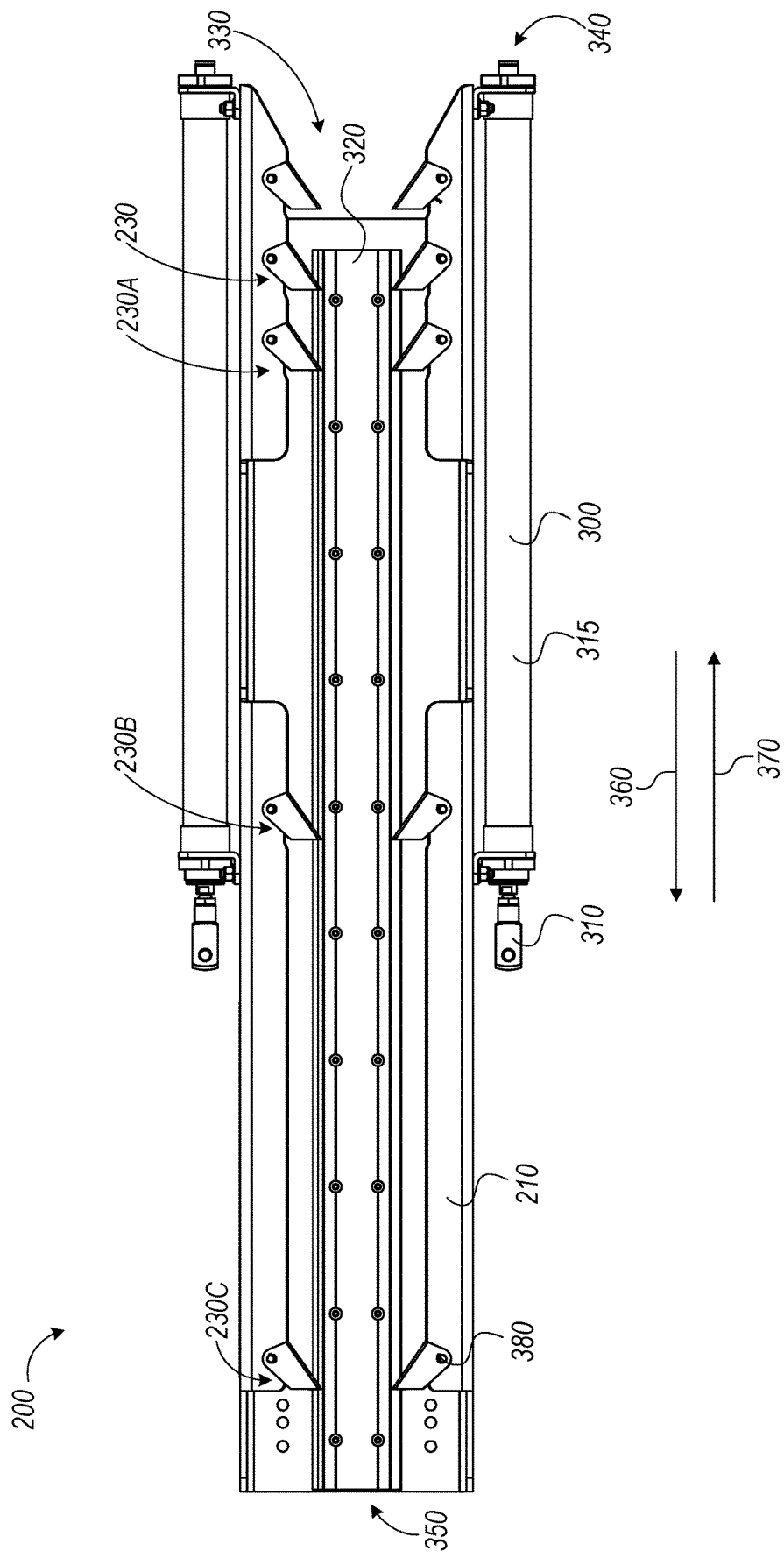
FIG. 3 illustrates a bottom view of an example of the carriage transporting apparatus of FIG. 2 including a frame according to one embodiment of the present subject matter.

FIG. 3 illustrates a bottom view of an example of the carriage transporting apparatus 200 of FIG. 2 including the frame 210 according to one embodiment of the present subject matter. An actuator 300 (e.g., a piston, cylinder, damper, etc.) may be coupled to the frame 210. The actuator 300 may translate one or more components of the apparatus 200, for example the shuttle 220. The actuator 300 may be operated electromechanically, hydraulically, or pneumatically, however the present subject matter is not so limited. For instance, the actuator 300 may include an extended configuration and a retracted configuration. In the extended configuration, an actuator rod 310 may extend (e.g., project, reach, cantilever, expand, or the like) from the actuator 300. For example, the actuator rod 310 may translate with respect to an actuator housing 315 of the actuator 300. In the retracted configuration, and the actuator rod 310 may be retracted (e.g., recoiled, contracted, shifted, transitioned, or the like) into the actuator housing 315. As described in greater detail herein, in some examples the actuator rod 310 extends from both ends of the actuator housing 315. For instance, the actuator rod 310 may reciprocate with respect to actuator housing 315.

As described in greater detail herein, the carriage transporting apparatus 200 may include a guide 320 (e.g., track, rod, etc.), and the guide 320 may interface with a portion of the shuttle 220 (e.g., as shown in FIG. 2) to facilitate a sliding engagement between the frame 210 and the shuttle 220. Accordingly, the guide 320 may facilitate the relative movement between shuttle 220 and the frame 210.

The frame 210 may define a carriage recess 330. The carriage recess 330 may be sized and shaped to receive a portion of the carriage 150 (e.g., as shown in FIG. 1). For example, the carriage 150 may be received in a first end 340 of the frame 210. The carriage 150 may translate within the carriage recess 330, for instance the carriage 150 may translate in a first direction 360. The carriage 150 may exit a second end 350 of the frame 210. The teeth 230 may extend into the carriage recess 330, and the teeth 230 may engage with the carriage 150 when the carriage 150 is received in the carriage recess 330.

The apparatus 200 may allow the carriage 150 to translate within the carriage recess 330 in a single direction. For example, the apparatus 200 may be used to elevate the carriage 150 between sections 120A, 120B, 120C (e.g., as shown in FIG. 1) of the rail 120. The apparatus 200 may allow the carriage 150 to translate in the first direction 360, and the apparatus 200 may inhibit the movement of the carriage in a second direction 370.

For example, the teeth 230 may engage with the carriage 150, and the teeth 230 may move (e.g., deflect, bend, rotate, yield, or the like) out of the way of carriage 150 when the carriage 150 translates in the first direction 360. For instance, the teeth 230 may be moveably coupled with the frame 210. The teeth 230 may rotate about a pin 380, and the rotation of the teeth 230 may facilitate the movement of the teeth 230 relative to the frame 210. The movement of the teeth 230 out of the way of the carriage 250 may allow the carriage 250 to enter the carriage recess 330.

The first set of teeth 230A may engage with the carriage 150 when the carriage enters the first end 340 of the apparatus 200. The engagement of the teeth 230 with the carriage 150 may inhibit (e.g., stop, hold, fasten, arrest, or the like) the translation of the carriage 150 within the carriage recess 330. For instance, the teeth may inhibit the movement of the carriage 150 in the second direction 370 with respect to the frame 210. As a result, the teeth 230A may hold the carriage 150 near the first end 340 of the frame 210. Accordingly, the teeth 230 may allow the carriage 150 to translate within the carriage recess 330 in the first direction 360, and the teeth 230 may inhibit the translation of the carriage 150 in the second direction 370.

The apparatus 200 may move the carriage 150 incrementally along the rail 120. For example, the carriage 150 may translate within the carriage recess 330 (e.g., in the first direction 360). The carriage 150 may be located between the teeth 230A and the teeth 230B. The carriage 150 may engage with the second set of teeth 230B. The teeth 230B may move out of the way of the carriage 150, and carriage 150 may be located between the teeth 230B and the teeth 230C. The teeth 230 may be biased toward the carriage recess 330, and the teeth 230 may move back into the path of the carriage 150 when the carriage 150 moves past the second set of teeth 230B (e.g., between the teeth 230B and the teeth 230C). Accordingly, the carriage 150 may be inhibited from reentering the carriage recess 330 between the teeth 230A and the teeth 230B. The carriage 150 may be inhibited from reentering the carriage recess 330 between the teeth 230B and the teeth 230C when the carriage 150 moves past the teeth 230C.

Figure 6:
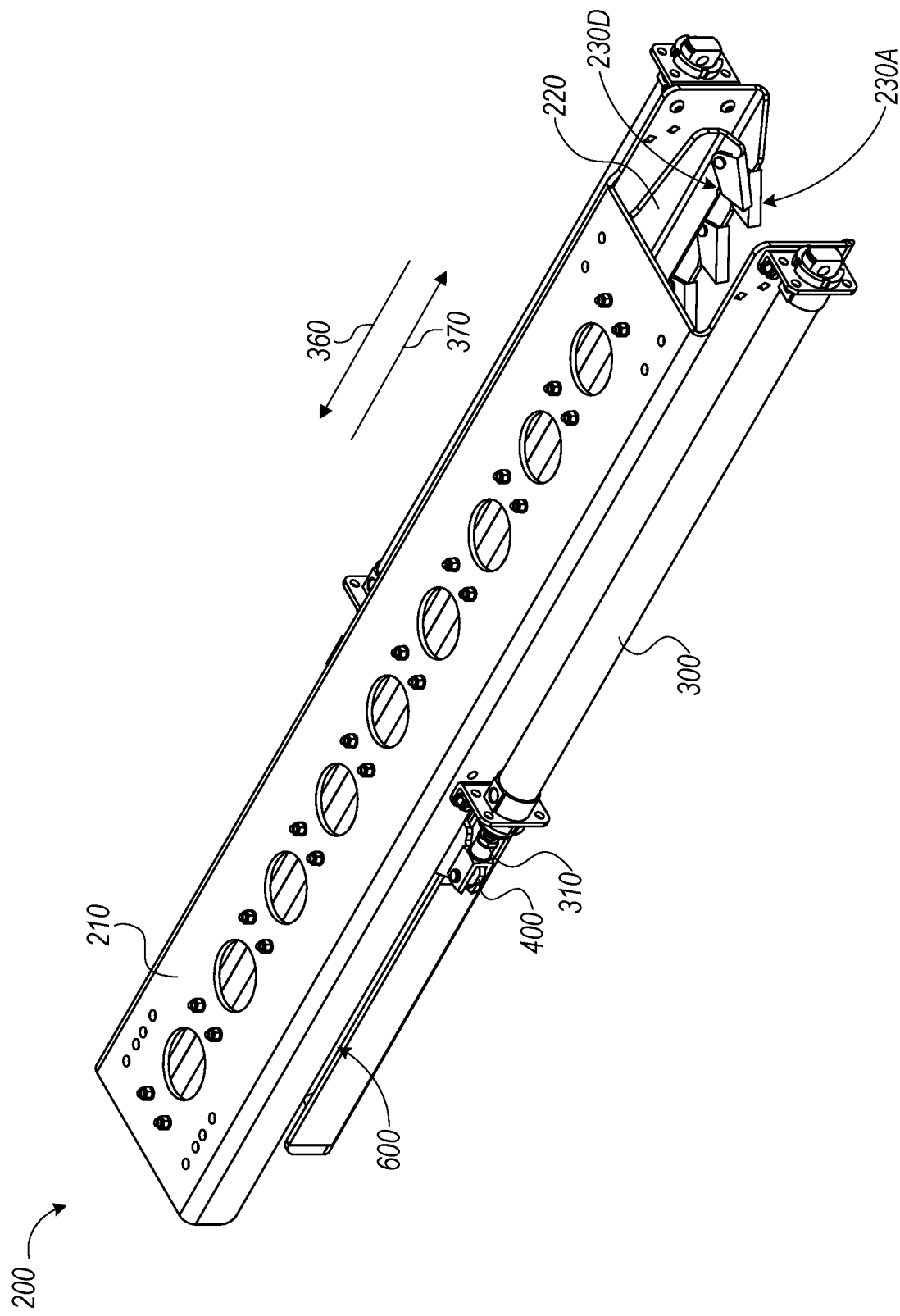
FIG. 6 illustrates an isometric view of another example of the carriage transporting apparatus of FIG. 2 according to one embodiment of the present subject matter.

FIG. 4 illustrates a bottom view of an example of the shuttle 220 for the carriage transporting apparatus 200 of FIG. 2 according to one embodiment of the present subject matter. As described herein, the shuttle 220 may be moveably coupled to the frame 210 (e.g., as shown in FIG. 2). The actuator rod 310 may be coupled with a flange 400 of the shuttle 220, and movement of the actuator rod 310 may cause a corresponding movement of the shuttle 220 (e.g., movement of the flange 400 within the slot 600, for example as shown in FIG. 6).

The shuttle 220 may include a fourth set of teeth 230D and may include a fifth set of teeth 230E. The teeth 230D, 230E may be similar to the teeth 230A, 230B, 230C (e.g., as shown in FIG. 3). Accordingly, the teeth 230D, 230E may allow the carriage 150 (e.g., as shown in FIG. 1) to translate within the carriage recess 330 (e.g., as shown in FIG. 3) in the first direction 360, and the teeth 230 may inhibit the translation of the carriage 150 in the second direction 370.

The shuttle 220 may help move the carriage 150 through the carriage transporting apparatus 200 (e.g., as shown in FIG. 2). The shuttle 220 may engage with the carriage 150 to move the carriage 150 in the first direction 360 with respect to the frame 210. The shuttle 220 may help move the carriage 150 along the rail 120. For example, the teeth 230D, 230E may extend into the carriage recess 330 (e.g., as shown in FIG. 3), and the teeth 230D, 230E may engage with the carriage 150. The shuttle 220 may be translated (e.g., by the actuator rod 310, for example as shown in FIG. 3), and the translation of the shuttle 220 may cause a corresponding translation of the carriage 150.

As described herein, the teeth 230 may engage with the carriage 150. For example, the teeth 230 (e.g., the tooth 700, shown for instance in FIG. 7) may include a holding face 410. The holding face 410 may engage with the carriage 150, for instance to move the carriage 150 along the rail 120 in the first direction 360. The holding face 410 may extend into the carriage recess 330. In an example, the holding face 410 extends into a path of the carriage 150. For instance, the teeth 230 may inhibit the carriage 150 from moving in the second direction when the holding face 410 of the teeth 230 extend into the carriage recess 330 (and the path of the carriage 150).

The teeth 230 may include a deflection face 420. The deflection face 420 may extend into the carriage recess 330. The teeth 230 may move when a force is applied to the deflection face 420. For instance, the carriage 150 may move the teeth 230 when the carriage 150 moves in the first direction 360. As discussed herein, applying a force to the deflection face 420 may transition the tooth 700 between the holding configuration and the disengaged configuration.

Figure 5A:
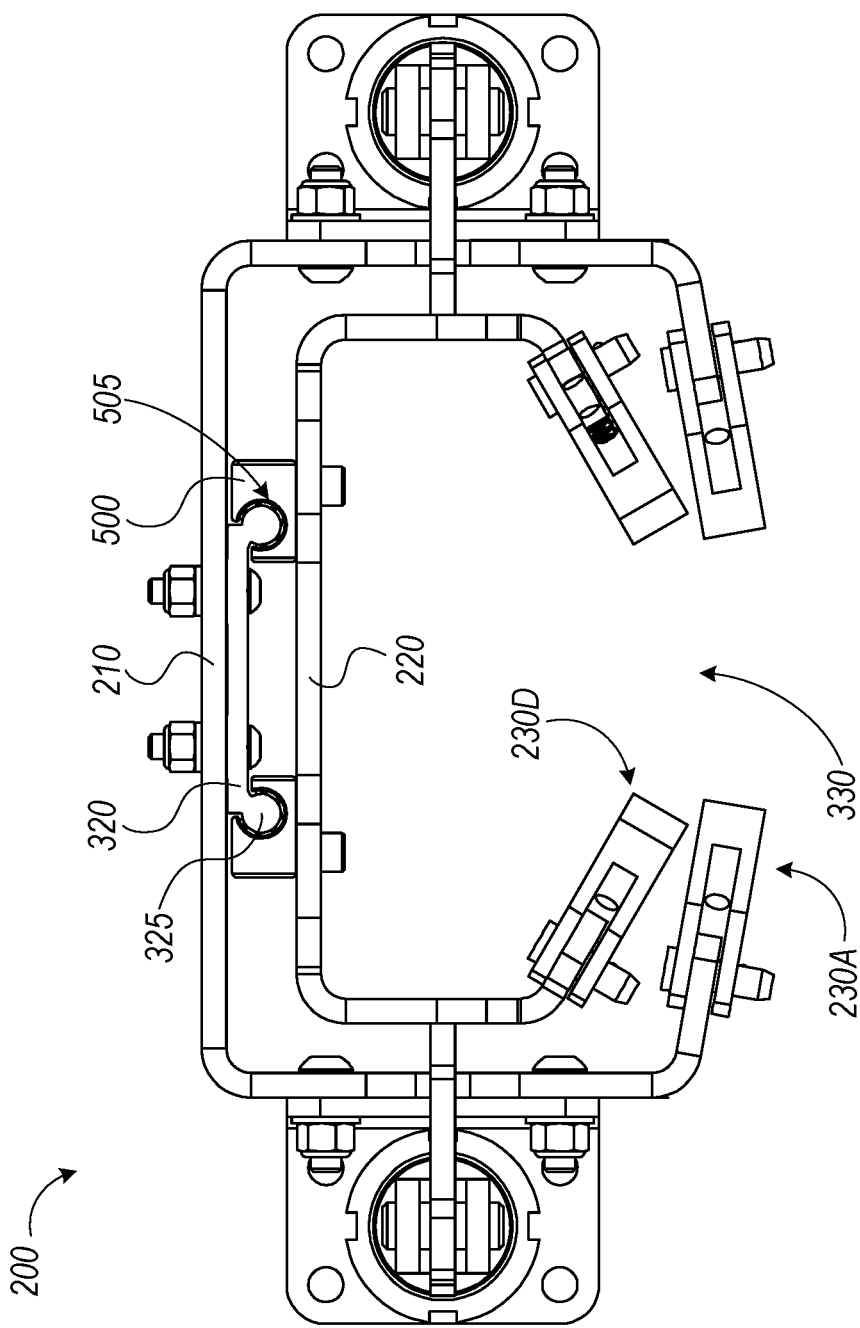
FIG. 5A illustrates an end view of an example of the carriage transporting apparatus of FIG. 2 according to one embodiment of the present subject matter.

FIG. 5A illustrates an end view of an example of the carriage transporting apparatus 200 of FIG. 2 according to one embodiment of the present subject matter. As described herein, the shuttle 220 may be moveably coupled with the frame 210, and the shuttle 220 may translate with respect to the frame 210. For example, the shuttle 220 may include a guide block 500, and the guide block 500 may be sized and shaped to receive the guide 320 of the frame 210. In an example, the guide 320 includes a key 325, and the guide block 500 includes a keyway 505. The keyway 505 may receive the key 325, for instance to slidingly engage the guide block 500 with the guide 320. Accordingly, the shuttle 220 may translate with respect to the frame 210 (e.g., in the first direction 360 or the second direction 370, for example as shown in FIG. 3).

The teeth 230A, 230D may extend into the carriage recess 330, and the teeth 230A, 230D may engage with the carriage 150 (e.g., as shown in FIG. 5B). The translation of the shuttle 220 may correspondingly move the carriage 150 because the teeth 230A, 230D may engage with the carriage 150 to move the carriage 150. Accordingly, the carriage 150 may translate with respect to the apparatus 200.

FIG. 5B illustrates another end view of an example of the carriage transporting apparatus 200 of FIG. 2 according to one embodiment of the present subject matter. The apparatus 200 may move the carriage 150 along the rail 120. For example, the carriage 150 may include a wheel 510, and the carriage 150 may be suspended from the rail by the wheel 510. The wheel 510 may rotate, and the wheel 510 may roll along the rail 120. The rotation of the wheel 510 may facilitate the movement of the carriage 150 along the rail 120.

The teeth 230 of the frame 210 may be angled. For example, the teeth 230A may be angled at the angle α (e.g., 8 degrees, 10 degrees, 15 degrees, or the like). The teeth 230 of the shuttle 220 may be angled. For instance, the teeth 230D may be angled at the angle β (e.g., 25 degrees, 30 degrees, 33 degrees, or the like). The teeth 230 may have a maximum angle γ (e.g., 37 degrees, 42 degrees, 43 degrees, or the like). Locating the teeth 230 at the maximum angle γ may allow the carriage 150 to move through the apparatus 200 without binding against components of the apparatus 200, for instance binding with the teeth 230.

FIG. 6 illustrates an isometric view of another example of the carriage transporting apparatus 200 of FIG. 2 according to one embodiment of the present subject matter. As described herein, the shuttle 220 may translate with respect to the frame 210, for instance with operation of the actuator 300. The actuator rod 310 may be coupled with the flange 400 of the shuttle 220, and movement of the actuator rod 310 may cause a corresponding movement of the shuttle 220. For example, the flange 400 of the shuttle 220 may project through a slot 600 (e.g., aperture, opening, hole, cavity, or the like) of the frame 210. The actuator rod 310 may extend and correspondingly translate the flange 400 within the slot 600 of the frame 210. Accordingly, the shuttle 220 may translate with respect to the frame 210 corresponding to the extension (or retraction) of the actuator rod 310.

The teeth 230 of the apparatus may move relative to each other. For example, the teeth 230D of the shuttle 220 may translate with respect to the teeth 230A of the frame 210. The teeth 230D may move beyond the teeth 230A in the first direction 360 or the second direction 370. For example, the teeth 230A may hold (e.g., secure, grasp, maintain the location of) the carriage 150 (e.g., as shown in FIG. 5B). The shuttle 220 (including the teeth 230D) may translate in the second direction 370. The teeth 230D may engage with the carriage 150, and the shuttle 220 (including the teeth 220D) may translate in the first direction 360. The teeth 230A may move out of the way of the carriage 150, and allow the carriage 150 to move in the first direction 360 with the shuttle 220. The shuttle 220 may continue to translate in the first direction 360, and the shuttle 220 may move the carriage 150 with respect to the frame 210.

Figure 7:
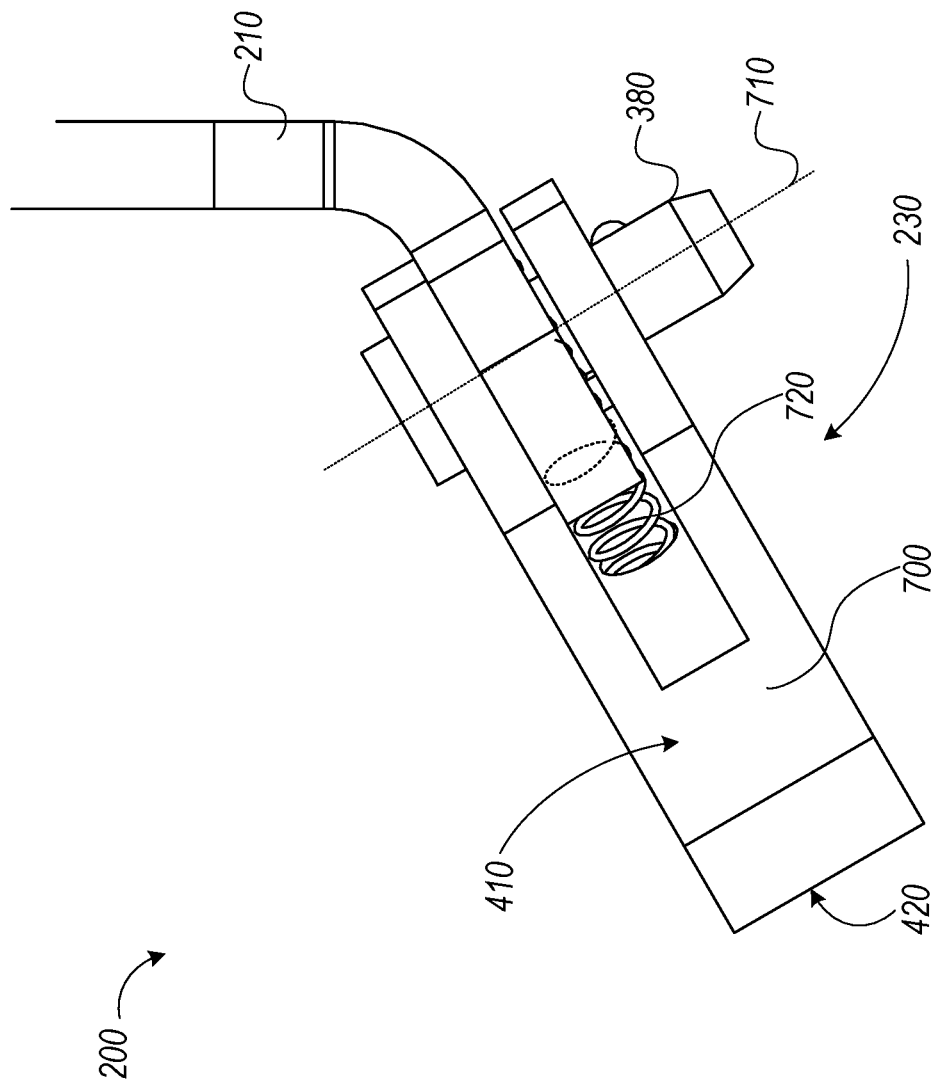
FIG. 7 illustrates a side view of an example of a tooth assembly according to one embodiment of the present subject matter.

FIG. 7 illustrates a side view of an example of a tooth 700 according to one embodiment of the present subject matter. As described herein, the apparatus 200 may include the teeth 230. The teeth 230 may include the tooth 700. The teeth 230 may be moveably coupled with the frame 210, or with the shuttle 220. For example, the teeth 230 may pivot about respective tooth axis 710. The pin 380 may be coupled with the frame 210 (or the shuttle 220), and the tooth 700 may rotate about the pin 380.

The tooth 700 may be biased away from the frame 210 (or the shuttle 220), for example biased toward the carriage recess 330 (e.g., as shown in FIG. 3), for instance in a holding configuration. A biasing member 720 may be located between the tooth 700 and the frame 210. The biasing member 720 (e.g., a spring, or the like) may bias the tooth 700 away from the frame 210. The bias of the biasing member 720 may be overcome to move the tooth 700, for instance in a disengaged configuration. In the disengaged configuration, the tooth 700 may move out of the way of the carriage 150. In an example, the carriage 150 may apply a force to the deflection face 420 to move the tooth 700 and overcome the bias of the tooth biasing member 420. Accordingly, applying a force to the deflection face 420 may transition the tooth 700 between the holding configuration and the disengaged configuration.

The tooth 700 may include a polymeric material, or a metal material. The tooth 700 may be a sacrificial wear item. For instance, the tooth may include a polymeric material, and the carriage 150 (e.g., as shown in FIG. 5B) may include a metal material. The polymeric material may be less resilient than the metal material, and the tooth 700 may wear when the tooth 700 engages with the carriage 150. Accordingly, the tooth 700 may wear, and wearing of the tooth 700 may improve the lifetime of the carriage 150. The pin 380 may be removed, a new tooth 700 may be located proximate to the frame 210 (or the shuttle 220), and the pin 380 may be reinserted into the frame 210 (or the shuttle 220) and the tooth 700 to moveably couple the tooth 700 with the frame 210 (or the shuttle 220).

Figure 8B:
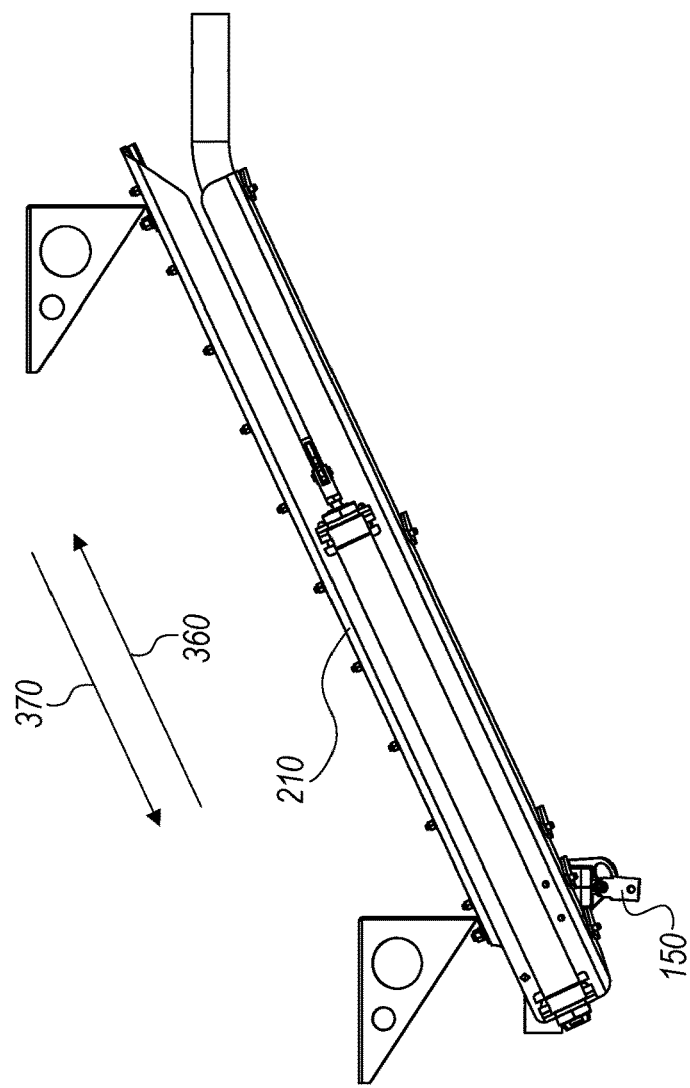
FIG. 8A and FIG. 8B illustrate bottom and side views respectively of an example of the carriage transporting apparatus in a first configuration according to one embodiment of the present subject matter.
Figure 8A:
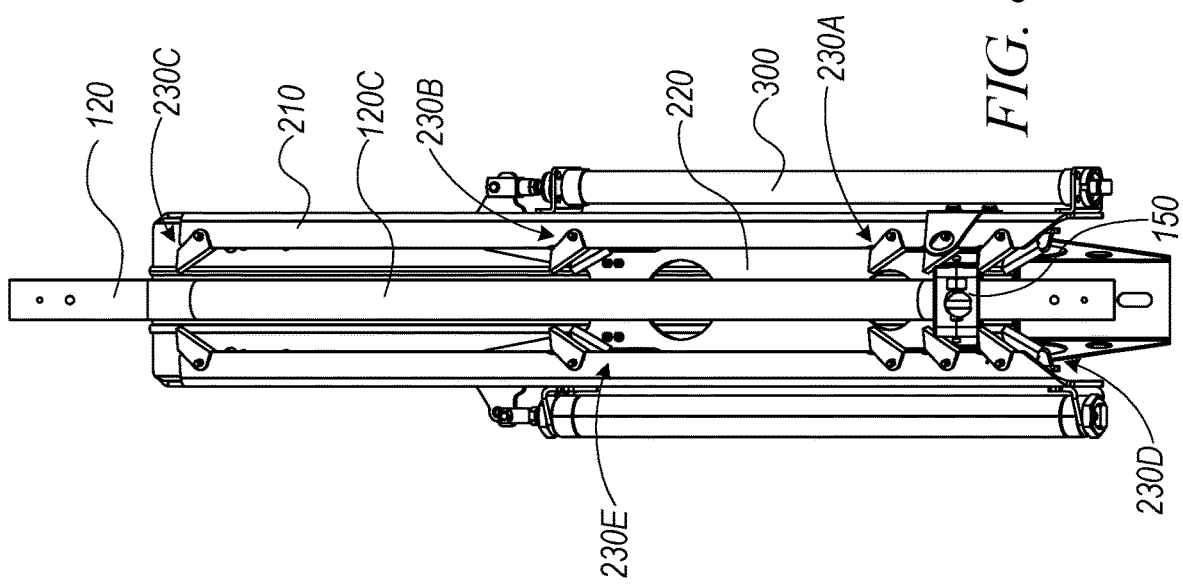

FIG. 8A and FIG. 8B illustrate bottom and side views respectively of an example of the carriage transporting apparatus 200 in a first configuration according to one embodiment of the present subject matter. As described herein, the shuttle 220 may translate with respect to the frame 210. The teeth 230A, 230B, 230C, 230D, 230E may allow the shuttle 220 to translate in the first direction 360. The teeth 230A, 230B, 230C, 230D, 230E may inhibit the translation of the shuttle 220 in the second direction 370. For example, the apparatus 200 may be inclined (e.g., at 10 degrees, 16 degrees, 17 degrees, 25 degrees, or the like). The apparatus 200 may move the carriage 150 along the rail 120, for instance the apparatus 200 may move (e.g., lift) the carriage 150 through the transition section 120C of the rail 120.

The actuator 300 may be in the retracted configuration. The teeth 230D may be located behind (e.g., further in the second direction 370 than) the teeth 230A. The teeth 230E may be located behind the teeth 230B. The carriage 150 may enter the carriage recess 330, and the teeth 230A may hold the carriage 150.

Figure 9B:
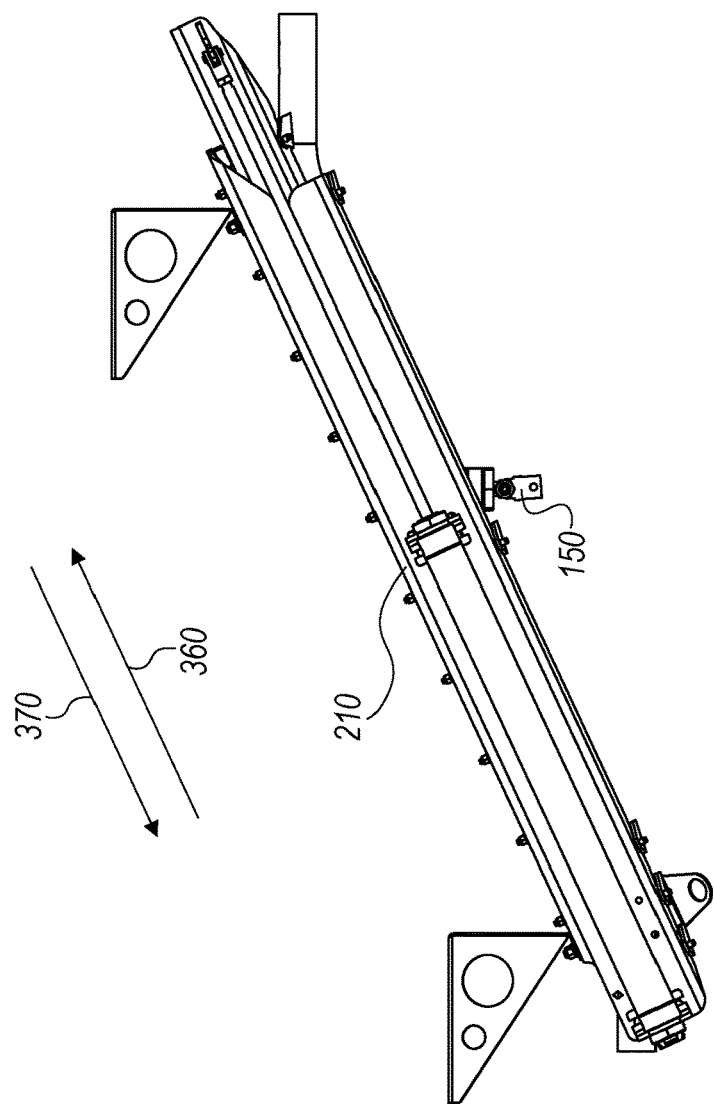
FIG. 9A and FIG. 9B illustrate bottom and side views respectively of an example of the carriage transporting apparatus in a second configuration according to one embodiment of the present subject matter.
Figure 9A:
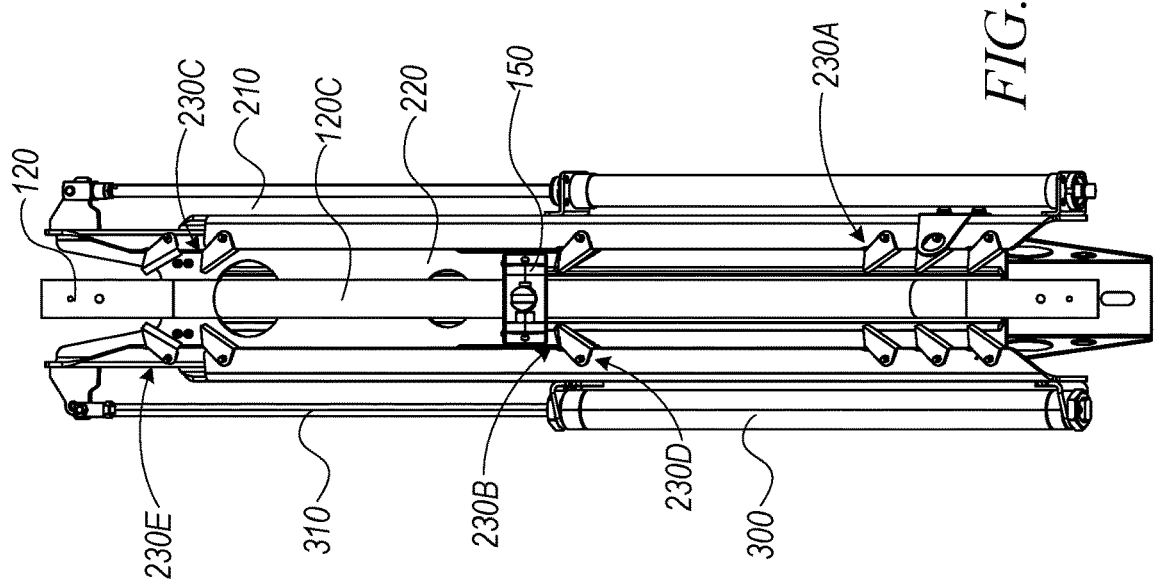

FIG. 9A and FIG. 9B illustrate bottom and side views respectively of an example of the carriage transporting apparatus 200 in a second configuration according to one embodiment of the present subject matter. The actuator 300 may be in the extended configuration, and the extending of the actuator rod 310 may translate the shuttle 220 with respect to the frame 210. The teeth 230D of the shuttle 220 may engage with the carriage 150, and the translation of the shuttle 220 may move the carriage 150 along the rail 120. The shuttle 220 may move the carriage 150 between the teeth 230B and the teeth 230C. The carriage 150 may be held by the teeth 230B, for instance because gravity may act upon the carriage 150 and bias the carriage 150 toward the teeth 230B. The teeth 230B may inhibit the movement of the carriage 150 in the second direction 370. Accordingly, the carriage 150 may be held in one or more locations along the frame 210 by the teeth 230.

The carriage 150 may be moved incrementally along the rail 120, for instance by holding the carriage with the teeth 230B. Moving the carriage 150 incrementally along the rail 120 may facilitate reducing the size of the apparatus 200, and may reduce the energy consumption of the apparatus 200. Moving the carriage 150 incrementally along the rail 120 may reduce the costs associated with manufacturing the apparatus 200.

Figure 10B:
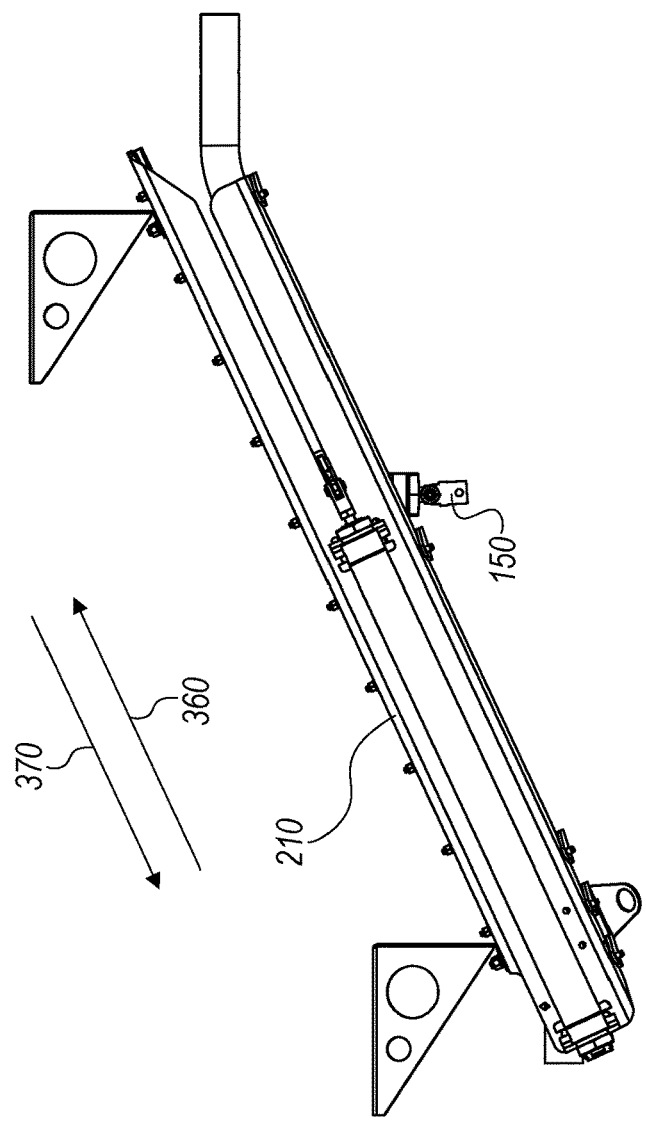
FIG. 10A and FIG. 10B illustrate bottom and side views respectively of an example of the carriage transporting apparatus in a third configuration according to one embodiment of the present subject matter.
Figure 10A:
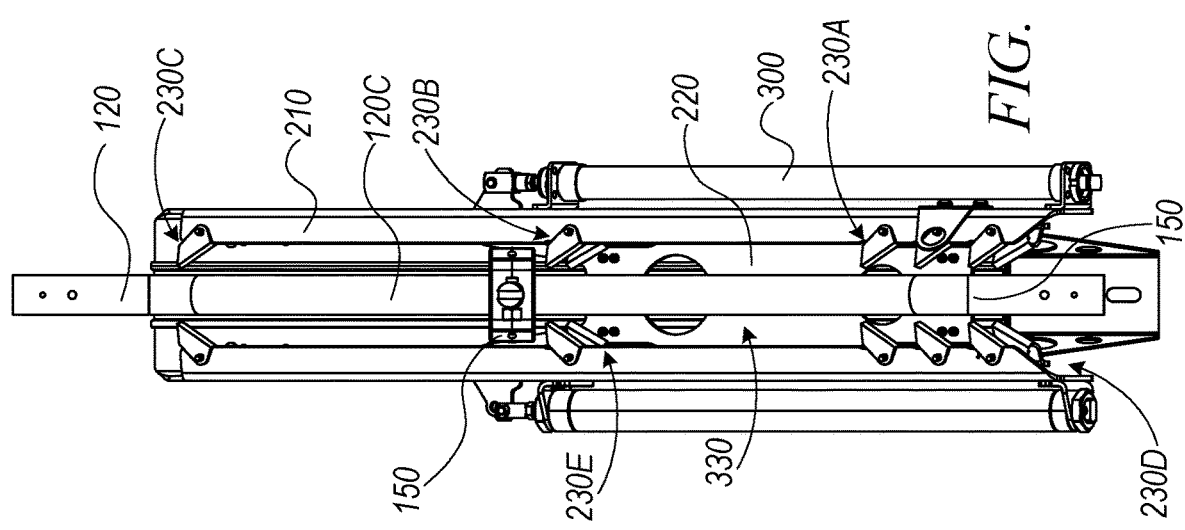

FIG. 10A and FIG. 10B illustrate bottom and side views respectively of an example of the carriage transporting apparatus 200 in a third configuration according to one embodiment of the present subject matter. The shuttle 220 may translate in the second direction 370 when the carriage 150 is held by the teeth 230B. For instance, the actuator 300 may be operated to the retracted configuration, and operation of the actuator 300 may translate the shuttle 220 in the second direction 370. The teeth 230D may move out of the way of the carriage 150 when the shuttle 220 moves in the second direction 370. The teeth 230E may move out of the way of the carriage 150 when the shuttle 220 is moved in the second direction 370.

The teeth 230E may be located between the teeth 230B (or the teeth 230A) and the carriage 150. The teeth 230E may be biased toward the carriage recess 330, and the teeth 230 may engage with the carriage 150, for instance when the shuttle 220 is moved in the first direction 360. The teeth 230E may engage with a first carriage 150, and the teeth 230D may engage with a second carriage 150. Accordingly, the shuttle 220 may move one or more carriages (e.g., the first carriage and the second carriage) along the rail 120. For instance, the shuttle may move the first carriage and the second carriage in unison along the rail 120.

FIG. 11A and FIG. 11B illustrate bottom and side views respectively of an example of the carriage transporting apparatus 200 in a fourth configuration according to one embodiment of the present subject matter. The carriage 150 may be moved along the rail 120, for instance by operating the actuator 300 to the extended configuration and translating the shuttle 220 with respect to the frame 210. The teeth 230E may engage with the carriage 150 and the translation of the shuttle 220 may move the carriage 150 along the rail 120, for instance in the first direction 360. The shuttle 220 may eject (e.g., discharge, push, expel, or the like) the carriage 150 from the apparatus 200. The teeth 230 may extend beyond the teeth 230C, for instance to eject the carriage 150 from the apparatus 200. Accordingly, the apparatus 200 may move the carriage 150 along the rail 120, for instance by moving the carriage 150 from the first section 120A, along the transition section 120C, and moving the carriage 150 to the second section 120B (e.g., as shown in FIG. 1).

Figure 12:
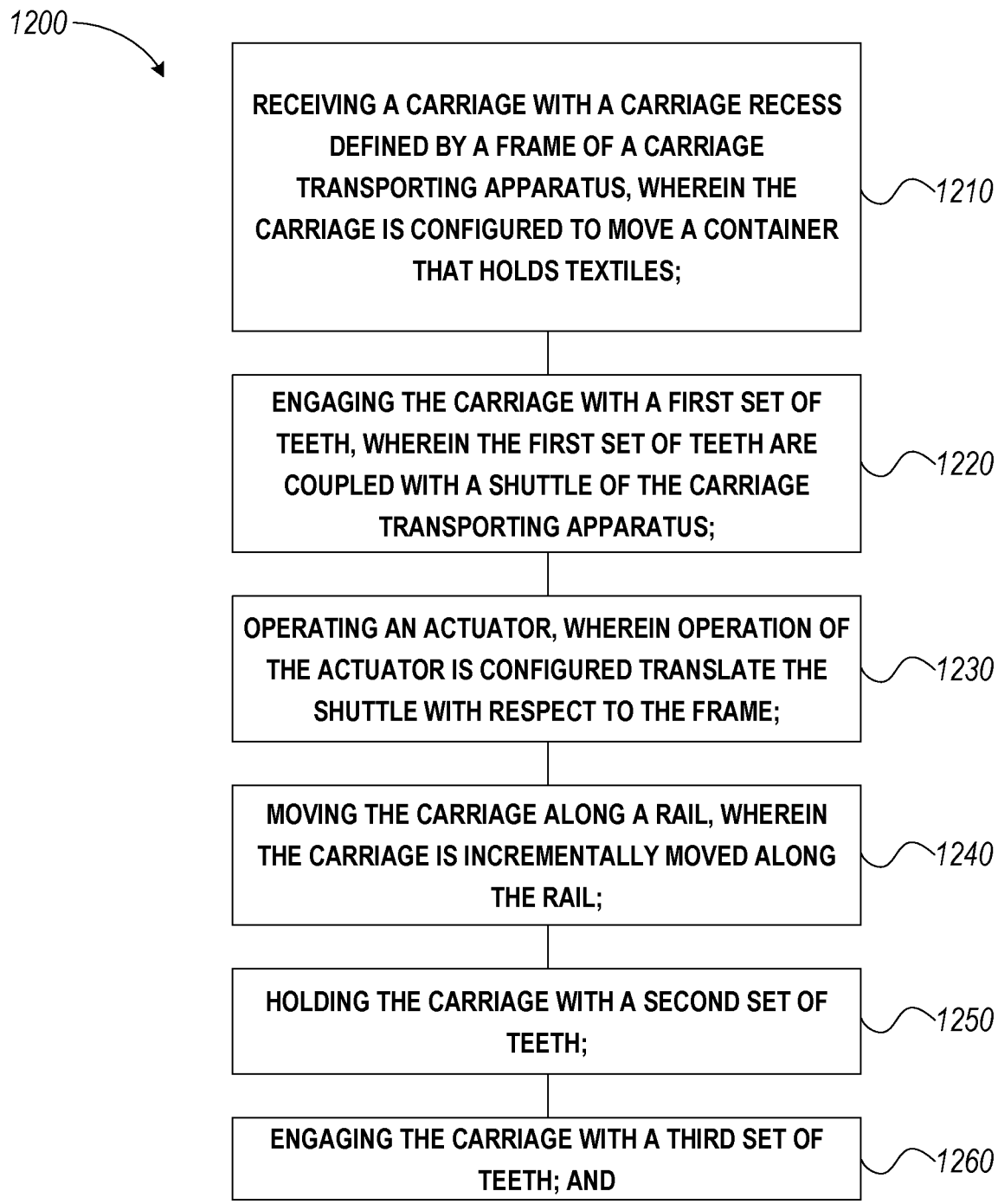
FIG. 12 illustrates one example of a method for moving items along a rail according to one embodiment of the present subject matter.

FIG. 12 illustrates one example of a method for moving items (e.g., textiles, laundry, linens, clothing, or the like) along the rail 120, including one or more of the carriage transporting apparatus 200 described herein. In describing the method 1200, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 1200 include, but are not limited to, the corresponding numbered elements provided herein and other corresponding elements described herein (both numbered and unnumbered) as well as their equivalents.

At 1210, a carriage 150 may be received with a carriage recess 330 defined by a frame 210 of a carriage transporting apparatus 200. The carriage 150 may be configured to move a container 160 that may hold items, for example textiles.

The method 1200 may include at 1220 engaging the carriage 150 with a first set of teeth 230 (e.g., the teeth 230D). The teeth 230 may be coupled to a shuttle 220. At 1230, an actuator 300 may be operated (e.g., between a retracted configuration and an extended configuration). Operation of the actuator 300 may translate the shuttle 220 with respect to the frame 210. Operation of the actuator 300 may include translating the actuator rod 310 with respect to the actuator housing 315. The actuator rod 310 may be oscillated with respect to the actuator housing 315. For instance, the actuator rod 310 may be oscillated to incrementally move the carriage 150 through the apparatus 200 (e.g., moving the carriage 150 along the rail 120).

At 1240, the carriage 150 may be moved along the rail 120. The carriage 150 may be moved incrementally along the rail 120. The method 1200 may include at 1250 holding the carriage with a second set of teeth 230 (e.g., the teeth 230B). At 1260, a third set of teeth 230 (e.g., the teeth 230E) ma engage with the carriage. The carriage 150 may be ejected from the carriage transporting apparatus 200. For example, the third set of teeth 230 may provide an ejection force that moves the carriage along the rail 120, and moves the carriage 150 away from the apparatus 200.

The method 1200 may include transferring the carriage 150 from the first station 1300A to the second station 1300B. For example, the apparatus 200 may incrementally move the carriage 150 from the first station 1300A to the second station 1300B. The teeth 230 may hold the carriage 150 at the stations 1300.

Figure 13:
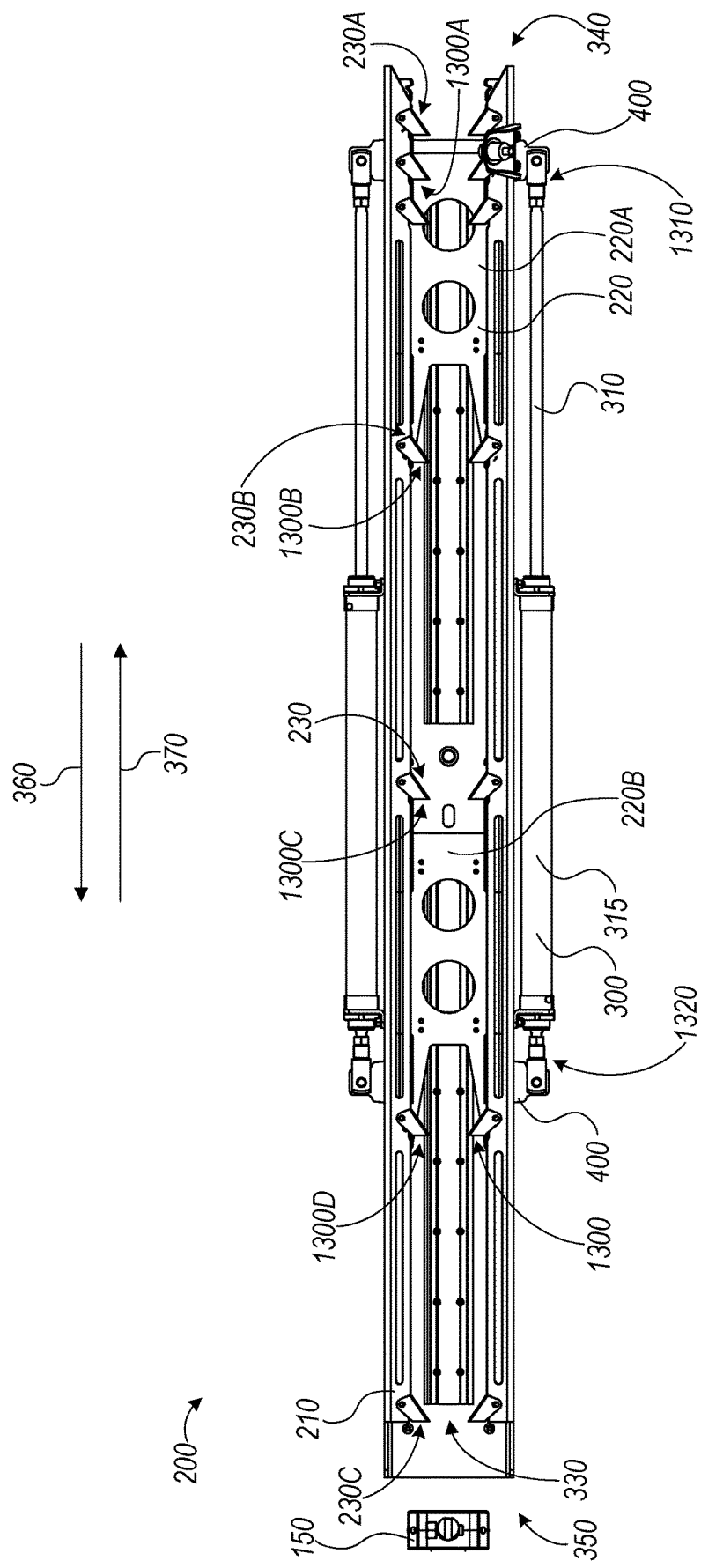
FIG. 13 illustrates a bottom view of another example of the carriage transporting apparatus according to one embodiment of the present subject matter.

The method 1200 may include transferring the carriage 150 from the first shuttle 220A to the second shuttle 220B (e.g., as shown in FIG. 13). In an example, the shuttle 220A incrementally moves the carriage 150 from the first station 1300A to the second station 1300B. The shuttle 220A may incrementally move the carriage 150 from the second station 1300B to the third station 1300C. The teeth 230 may hold the carriage 150 at the third station 1300C. The teeth 230 of the shuttle 220B may engage with the shuttle 150 located at the third station 1300C, and the shuttle 220B may incrementally move the carriage 150 from the third station 1300C to the fourth station 1300D.

FIG. 13 illustrates a bottom view of another example of the carriage transporting apparatus 200 according to one embodiment of the present subject matter. As described herein, the shuttle 220 may help move the carriage 150 (e.g., as shown in FIG. 1) through the carriage transporting apparatus 200 (e.g., as shown in FIG. 2). For instance, the shuttle 220 may engage with the carriage 150 to move the carriage 150 in the first direction 360 with respect to the frame 210. Accordingly, the shuttle 220 may help move the carriage 150 along the rail 120. The rail 120 is hidden in FIG. 13 for clarity.

In some examples, the carriage transporting apparatus 200 includes a plurality of stations 1300, and the carriages 150 may move through the stations 1300. For instance, the apparatus 200 may move the carriage 150 incrementally through the stations 1300. Accordingly, the apparatus 200 may move the carriage 150 incrementally along the rail 120 (e.g., by incrementally moving the carriage 150 incrementally through the transition section 120C of the rail 120).

In an example, the apparatus 200 include one or more stations 1300, for instance a first station 1300A, a second station 1300B, a third station 1300C, and a fourth station 1300D. The stations 1300 facilitate incremental movement of the carriage 150 through the carriage transporting apparatus 200. Operation of the actuator 300 translates the shuttle 220, and the translation of the shuttle 220 may move the carriage 150 (e.g., as shown in FIGS. 8A-11B) through the stations 1300. For example, the carriage 150 may be received in the first end 340 of the frame 210. The carriage 150 may move within the carriage recess 330 (e.g., in the first direction 360). The carriage 150 may move between the stations 1300 while located in the carriage recess 330.

In an example, the carriage transporting apparatus 200 includes one or more of the shuttle 220. For instance, the apparatus 200 optionally includes a first shuttle 220A and a second shuttle 220B. The actuator rod 310 may facilitate translation of the shuttles 220A, 220B with respect to the frame 210. For example, the actuator rod 310 may translate with respect to the actuator housing 315. The actuator rod 310 may extend from both ends of the actuator housing 315. For instance, a first end 1310 of the actuator rod 310 may be coupled with the flange 400 of the first shuttle 220A. A second end 1320 of the actuator rod 310 may be coupled with the flange 400 of the second shuttle 220B. Accordingly, the actuator rod 310 may interlink (e.g., attach, connect, unite, secure, or the like) the shuttle 220A with the shuttle 220B. Thus, the shuttle 220A may move in unison (e.g., simultaneously, in accordance, together, or the like) with the shuttle 220B.

The actuator 300 may be operated, for instance to translate the actuator rod 310 with respect to actuator housing 315. In an example, the actuator rod 310 reciprocates with respect to the actuator housing 315. The reciprocation of the actuator rod 310 translates the ends 1310, 1320 of the actuator rod 310 with respect to the actuator housing 315. For instance, the first end 1310 of the actuator rod 310 may be located proximate to the actuator housing 315 with the second end 1320 located remote from the actuator housing 315. The actuator rod 310 may be translated, for instance to adjust the location of the ends 1310, 1320 with respect to the housing 315. The second end 1320 of the actuator rod 310 may be located proximate to the actuator housing 315 with the first end 1310 located remote from the actuator housing 315.

Operation of the actuator 300 may translate the actuator rod 310, for example in the first direction 360. The shuttles 220A, 220B may translate according to the translation of the actuator rod 310. The translation of the shuttles 220A, 220B may move the carriage 150 through the apparatus 200, for example by moving the carriage 150 through the stations 1300. In an example, the shuttle 220A moves the carriage 150 from the first station 1300A to the second station 1300B.

In some examples, the teeth 230 inhibit movement of the carriage 150. The teeth 230 may facilitate unidirectional (e.g., ratcheting, or the like) movement of the carriage 150 through the apparatus 200. For instance, the carriage 150 may be moved through the stations 1300 in the first direction 360. In an example, when the carriage 150 enters the first station 1300A (e.g., through the end 340), the carriage 150 may be inhibited from exiting the carriage transporting apparatus 200. For example, the teeth 230 may inhibit movement of the carriage 150 in the second direction 370 and thereby inhibit the carriage 150 from exiting the apparatus 200. Accordingly, the teeth 230 may hold the carriage 150 hold the carriage 150 at the first station 1300A.

The shuttle 220A may move the carriage 150 (e.g., in the first direction 360) to the second station 1300B (e.g., past the teeth 230B). The teeth 230 may inhibit the carriage 150 from moving from the second station 1300B to the first station 1300A. For instance, the teeth 230B may hold the carriage 150 at the second station 1300B to inhibit movement of the carriage 150 in the second direction 370. The teeth 230B may engage with the carriage 150 to inhibit (e.g., stop, hold, fasten, arrest, or the like) the translation of the carriage 150 within the carriage recess 330 (e.g., in the second direction 370). Accordingly, the teeth 230 inhibit the carriage 150 from reentering the carriage recess 330 between the teeth 230A and the teeth 230B.

In an example, the apparatus 200 facilitates transfer of the carriage 150 between the shuttles 220A, 220B (e.g., from the first shuttle 220A to the second shuttle 220B). For instance, the actuator rod 310 is moved in the first direction 360. The shuttle 220A moves the carriage 150 from the second station 1300B to the third station 1300C according to the movement of the actuator rod 310. The teeth 230 hold the carriage 150 at the third station 1300C. The actuator rod 310 is moved in the second direction 370, for example while the teeth 230 hold the carriage 150 at the third station 1300C. The second shuttle 220B may engage with the carriage 150 at the third station 1300C. The actuator rod 310 may be translated in the first direction 360 with the shuttle 220B engaged with the carriage 150. For instance, the second shuttle 220B may move the carriage 150 from the third station 1300C to the fourth station 1300D. Accordingly, the carriage 150 may be transferred between the shuttles 220A, 220B—for instance while being held at one or more of the stations 1300.

The apparatus 200 may eject the carriage 150, for instance by translating the actuator rod 310 (and the shuttle 220B). In an example, the shuttle 220B may engage with the carriage 150 at the fourth station 1300D. The actuator rod 310 may be moved in the first direction 360, and the shuttle 220B moves the carriage 150 in the first direction 360. The shuttle 220B moves the carriage 150 past the teeth 230C, and the carriage 150 is ejected from the apparatus 200. The teeth 230C may inhibit the shuttle 220 from reentering the carriage recess 330 after the apparatus 200 ejects the carriage 150.

Figure 14:
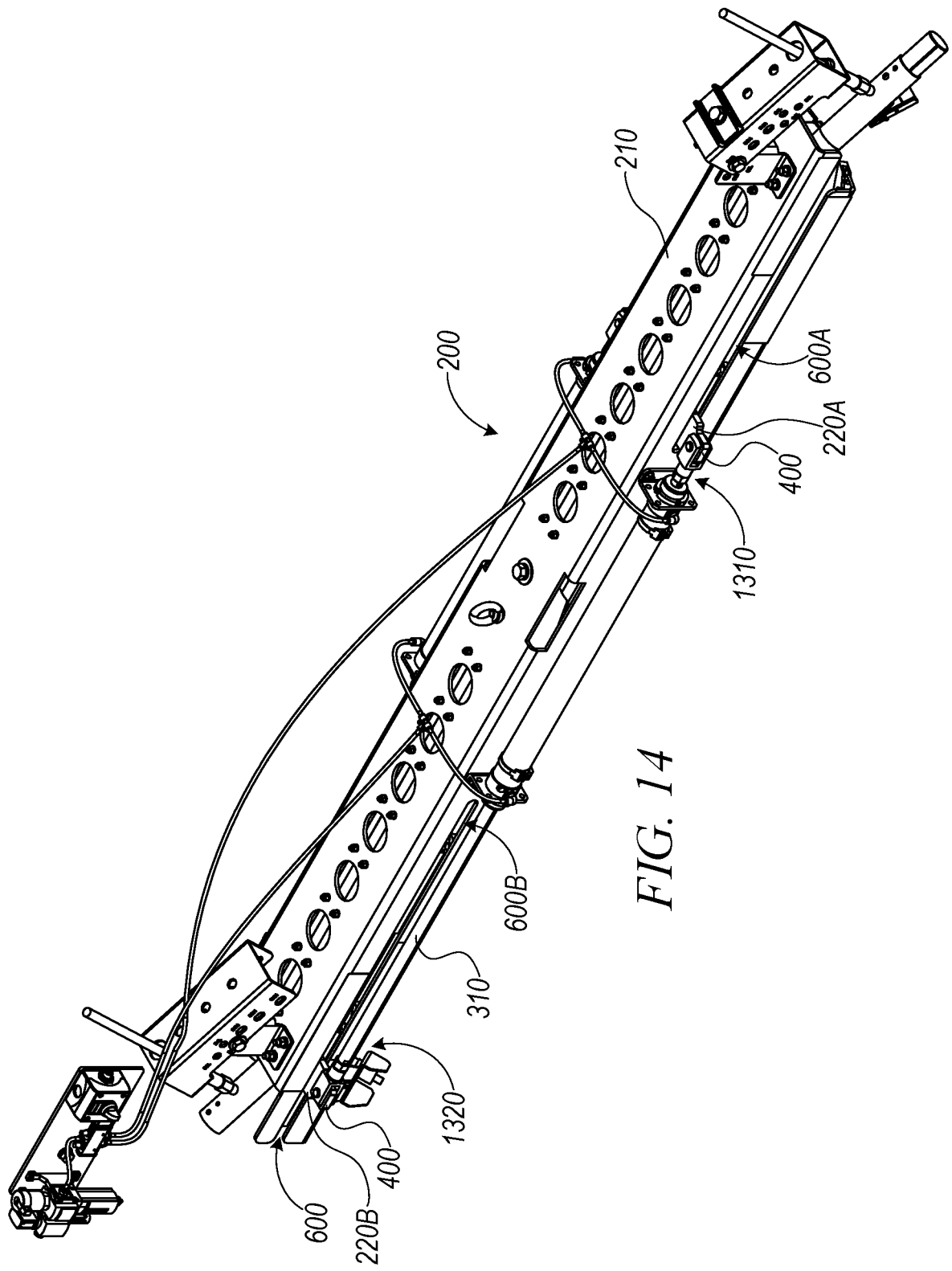
FIG. 14 illustrates an isometric view of the carriage transporting apparatus of FIG. 13 according to one embodiment of the present subject matter.

FIG. 14 illustrates an isometric view of the carriage transporting apparatus 200 of FIG. 13 according to one embodiment of the present subject matter. As described herein, the first end 1310 of the actuator rod 310 may be coupled with the flange 400 of the first shuttle 220A and the second end 1320 may be coupled with the flange 400 of the second shuttle 220B. The flanges 400 of the shuttles 220 may extend through slots 600 of the frame 210. In an example, the flange 400 of the first shuttle 220A may extend through a first slot 600A (e.g., the flange may extend from the carriage recess 330). The flange 400 of the second shuttle 220B may extend through a second slot 600B. Accordingly, the actuator rod 310 may engage with the shuttles 220 (e.g., to translate the shuttles 220).

EXAMPLES

This detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described.

In various embodiments the present subject matter can be realized in the following examples.

Example 1 is an apparatus for moving a carriage along a rail, comprising: a frame having a first set of teeth and a second set of teeth, a shuttle including a third set of teeth that are configured to engage with the carriage to translate the carriage in a first direction with respect to the frame when the carriage is engaged with the third set of teeth, wherein the carriage is configured to move a container suspended from the carriage; and wherein the first set of teeth, the second set of teeth, and the third set of teeth each include a tooth having a holding configuration and a disengaged configuration, wherein: in the holding configuration, the tooth extends into a carriage recess of the frame and a holding face of the tooth is configured to inhibit the translation of the carriage within the carriage recess in a second direction; and in the disengaged configuration, the tooth allows the carriage to translate within the carriage recess in the first direction.

In Example 2, the subject matter of Example 1 optionally includes wherein: translation of the shuttle in the first direction is configured to transport the carriage from engagement with the first set of the teeth to engagement with the second set of teeth, and the shuttle is configured to translate in the second direction while the carriage is engaged with the second set of teeth.

In Example 3, the subject matter of Example 2 optionally includes wherein: the frame includes a fourth set of teeth; and translation of the shuttle in the first direction is configured to transport the carriage from engagement with the second set of the teeth to a location beyond the fourth set of teeth.

In Example 4, the subject matter of Example 3 optionally includes wherein: the shuttle includes a fifth set of teeth, and the shuttle is configured to transport the carriage in the first direction when the carriage is engaged with the fifth set of teeth and the shuttle is translated in the first direction.

In Example 5, the subject matter of Example 4 optionally includes wherein the shuttle is configured to translate in the second direction to locate the fifth set of teeth between the first set of teeth and the second set of teeth when the carriage is engaged with the second set of teeth.

In Example 6, the subject matter of any one or more of Examples 1-5 optionally include wherein: the third set of teeth are moveable between a holding configuration and a disengaged configuration, wherein: in the holding configuration the third set of teeth are configured to engage with the carriage to inhibit movement of the carriage in the second direction, and in the disengaged configuration, the third set of teeth are configured to: allow the shuttle to translate with respect to the carriage, and allow the shuttle to translate in the second direction; and wherein the third set of teeth are biased toward the holding configuration.

In Example 7, the subject matter of any one or more of Examples 1-6 optionally include wherein: individual ones of the third set of teeth are configured to pivot about respective tooth axes, and pivoting of the third set of teeth about the tooth axes allows the carriage to translate in the first direction with respect to the tooth axes.

In Example 8, the subject matter of any one or more of Examples 1-7 optionally include a guide coupled with the frame; at least one guide block coupled with the shuttle; and wherein the guide is configured to slidingly engage with the guide block.

In Example 9, the subject matter of any one or more of Examples 1-8 optionally include at least one actuator coupled to the shuttle, wherein operation of the actuator is configured to translate the shuttle with respect to the frame.

Example 10 is a method for moving items along a rail, comprising: receiving a carriage within a carriage recess defined by a frame of a carriage transporting apparatus, wherein the carriage is configured to move a container suspended from the carriage; engaging the carriage with a first set of teeth, wherein the first set of teeth are coupled to a shuttle of the carriage transporting apparatus; operating an actuator, wherein operation of the actuator is configured to translate the shuttle with respect to the frame; moving the carriage along a rail, wherein the carriage is incrementally moved along the rail; holding the carriage with a second set of teeth; and engaging the carriage with a third set of teeth.

In Example 11, the subject matter of Example 10 optionally includes ejecting the carriage from the carriage transporting apparatus.

In Example 12, the subject matter of any one or more of Examples 10-11 optionally include wherein incrementally moving the carriage along the rail includes transferring the carriage from a first station to a second station, wherein the second set of teeth are configured to hold the carriage at the second station.

In Example 13, the subject matter of any one or more of Examples 10-12 optionally include wherein the carriage is a first carriage and operating the actuator includes translating an actuator rod with respect to an actuator housing, wherein: a first end of the actuator rod is coupled with the first shuttle, a second end of the actuator rod is coupled with a second shuttle; and translation of the actuator correspondingly moves the first shuttle and the second shuttle with respect to the frame.

In Example 14, the subject matter of any one or more of Examples 10-13 optionally include wherein the shuttle is a first shuttle, and further comprising: transferring the carriage from the first shuttle to a second shuttle.

In Example 15, the subject matter of Example 14 optionally includes wherein transferring the carriage from the first shuttle to the second shuttle includes: transferring the carriage from a first station to a second station with the first carriage; transferring the carriage from the second station to a third station.

Example 16 is an apparatus for moving a carriage and a container along a rail, comprising: a frame having a first set of teeth and a second set of teeth; a first shuttle including a third set of teeth that are configured to engage with the carriage to translate the carriage in a first direction with respect to the frame when the carriage is engaged with the third set of teeth, wherein the carriage is configured to move a container suspended from the carriage; and wherein the first set of teeth, the second set of teeth, and the third set of teeth extend into a carriage recess of the frame and are configured to: allow the carriage to translate within the carriage recess in the first direction; and inhibit the translation of the carriage within the carriage recess in a second direction.

In Example 17, the subject matter of Example 16 optionally includes a second shuttle including a fourth set of teeth that are configured to engage with the carriage, wherein the apparatus is configured to transfer the carriage from the first shuttle to the second shuttle.

In Example 18, the subject matter of any one or more of Examples 16-17 optionally include at least one actuator coupled to the first shuttle, wherein operation of the actuator is configured to translate the first shuttle with respect to the frame.

In Example 19, the subject matter of Example 18 optionally includes wherein the actuator includes an actuator rod having a first end and a second end, wherein: the first end is coupled with the first shuttle; and the second end is coupled with the second shuttle, and the actuator rod is configured to translate with respect to an actuator housing, and translation of the actuator rod correspondingly moves the first shuttle and the second shuttle.

In Example 20, the subject matter of Example 19 optionally includes wherein the first shuttle is configured to move in unison with the second shuttle.

In Example 21, the subject matter of any one or more of Examples 16-20 optionally include wherein the first shuttle is configured to incrementally move the carriage through a plurality of stations.

In Example 22, the subject matter of Example 21 optionally includes wherein the first shuttle is configured to incrementally move the carriage from a first station to a second station.

In Example 23, the subject matter of Example 22 optionally includes wherein the first shuttle is configured to incrementally move the carriage from the second station to a third station.

In Example 24, the subject matter of any one or more of Examples 22-23 optionally include a second shuttle, wherein the second shuttle is configured to incrementally move the carriage from the second station to a third station.

Example 25 is an apparatus for moving a carriage along a rail, comprising: a frame having a first set of teeth and a second set of teeth, a shuttle including a third set of teeth that are configured to engage with the carriage to translate the carriage in a first direction with respect to the frame when the carriage is engaged with the third set of teeth, wherein the carriage is configured to move a container suspended from the carriage; and wherein the first set of teeth, the second set of teeth, and the third set of teeth each include a tooth having a holding configuration and a disengaged configuration, wherein: in the holding configuration, the tooth extends into a carriage recess of the frame and a holding face of the tooth is configured to inhibit the translation of the carriage within the carriage recess in a second direction; and in the disengaged configuration, the tooth allows the carriage to translate within the carriage recess in the first direction.

In Example 26, the subject matter of Example 25 optionally includes wherein: translation of the shuttle in the first direction is configured to transport the carriage from engagement with the first set of the teeth to engagement with the second set of teeth, and the shuttle is configured to translate in the second direction while the carriage is engaged with the second set of teeth.

In Example 27, the subject matter of Example 26 optionally includes wherein: the frame includes a fourth set of teeth; and translation of the shuttle in the first direction is configured to transport the carriage from engagement with the second set of the teeth to a location beyond the fourth set of teeth.

In Example 28, the subject matter of Example 27 optionally includes wherein: the shuttle includes a fifth set of teeth, and the shuttle is configured to transport the carriage in the first direction when the carriage is engaged with the fifth set of teeth and the shuttle is translated in the first direction.

In Example 29, the subject matter of Example 28 optionally includes wherein the shuttle is configured to translate in the second direction to locate the fifth set of teeth between the first set of teeth and the second set of teeth when the carriage is engaged with the second set of teeth.

In Example 30, the subject matter of any one or more of Examples 25-29 optionally include wherein: the third set of teeth are moveable between a holding configuration and a disengaged configuration, wherein: in the holding configuration the third set of teeth are configured to engage with the carriage to inhibit movement of the carriage in the second direction, and in the disengaged configuration, the third set of teeth are configured to: allow the shuttle to translate with respect to the carriage, and allow the shuttle to translate in the second direction; and wherein the third set of teeth are biased toward the holding configuration.

In Example 31, the subject matter of any one or more of Examples 25-30 optionally include wherein: individual ones of the third set of teeth are configured to pivot about respective tooth axes, and pivoting of the third set of teeth about the tooth axes allows the carriage to translate in the first direction with respect to the tooth axes.

In Example 32, the subject matter of any one or more of Examples 25-31 optionally include a guide coupled with the frame; at least one guide block coupled with the shuttle; and wherein the guide is configured to slidingly engage with the guide block.

In Example 33, the subject matter of any one or more of Examples 25-32 optionally include at least one actuator coupled to the shuttle, wherein operation of the actuator is configured to translate the shuttle with respect to the frame.

Example 34 is a method for moving items along a rail, comprising: receiving a carriage within a carriage recess defined by a frame of a carriage transporting apparatus, wherein the carriage is configured to move a container suspended from the carriage; engaging the carriage with a first set of teeth, wherein the first set of teeth are coupled to a shuttle of the carriage transporting apparatus; operating an actuator, wherein operation of the actuator is configured translate the shuttle with respect to the frame; moving the carriage along a rail, wherein the carriage is incrementally moved along the rail; holding the carriage with a second set of teeth; and engaging the carriage with a third set of teeth.

In Example 35, the subject matter of Example 34 optionally includes ejecting the carriage from the carriage transporting apparatus.

In Example 36, the subject matter of any one or more of Examples 34-35 optionally include wherein incrementally moving the carriage along the rail includes transferring the carriage from a first station to a second station, wherein the second set of teeth are configured to hold the carriage at the second station.

In Example 37, the subject matter of any one or more of Examples 34-36 optionally include wherein the carriage is a first carriage and operating the actuator includes translating an actuator rod with respect to an actuator housing, wherein: a first end of the actuator rod is coupled with the first shuttle, a second end of the actuator rod is coupled with a second shuttle; and translation of the actuator correspondingly moves the first shuttle and the second shuttle with respect to the frame.

In Example 38, the subject matter of any one or more of Examples 34-37 optionally include wherein the shuttle is a first shuttle, and further comprising: transferring the carriage from the first shuttle to a second shuttle.

In Example 39, the subject matter of Example 38 optionally includes wherein transferring the carriage from the first shuttle to the second shuttle includes: transferring the carriage from a first station to a second station with the first carriage; transferring the carriage from the second station to a third station.

Example 40 is an apparatus for moving a carriage and a container along a rail, comprising: a frame having a first set of teeth and a second set of teeth; a first shuttle including a third set of teeth that are configured to engage with the carriage to translate the carriage in a first direction with respect to the frame when the carriage is engaged with the third set of teeth, wherein the carriage is configured to move a container suspended from the carriage; and wherein the first set of teeth, the second set of teeth, and the third set of teeth extend into a carriage recess of the frame and are configured to: allow the carriage to translate within the carriage recess in the first direction; and inhibit the translation of the carriage within the carriage recess in a second direction.

In Example 41, the subject matter of Example 40 optionally includes a second shuttle including a fourth set of teeth that are configured to engage with the carriage, wherein the apparatus is configured to transfer the carriage from the first shuttle to the second shuttle.

In Example 42, the subject matter of any one or more of Examples 40-41 optionally include at least one actuator coupled to the first shuttle, wherein operation of the actuator is configured to translate the first shuttle with respect to the frame.

In Example 43, the subject matter of Example 42 optionally includes wherein the actuator includes an actuator rod having a first end and a second end, wherein: the first end is coupled with the first shuttle; and the second end is coupled with the second shuttle, and the actuator rod is configured to translate with respect to an actuator housing, and translation of the actuator rod correspondingly moves the first shuttle and the second shuttle.

In Example 44, the subject matter of Example 43 optionally includes wherein the first shuttle is configured to move in unison with the second shuttle.

In Example 45, the subject matter of any one or more of Examples 40-44 optionally include wherein the first shuttle is configured to incrementally move the carriage through a plurality of stations.

In Example 46, the subject matter of Example 45 optionally includes wherein the first shuttle is configured to incrementally move the carriage from a first station to a second station.

In Example 47, the subject matter of Example 46 optionally includes wherein the first shuttle is configured to incrementally move the carriage from the second station to a third station.

In Example 48, the subject matter of any one or more of Examples 46-47 optionally include a second shuttle, wherein the second shuttle is configured to incrementally move the carriage from the second station to a third station.

Example 49 may include or use, or may optionally be combined with any portion or combination of any portions of any one or more of Examples 1 through 48, for instance to include or use, subject matter that may include means for performing any one or more of the functions of Examples 1 through 48, or a machine-readable medium including instructions that, when performed by a machine, cause the machine to perform any one or more of the functions of Examples 1 through 48.

In this document, the terms "a" or "an" are used to include one or more than one. In the following claims, the terms "first," "second," and "third," etc. are used merely as labels, and are not intended to impose numerical requirements on their objects.

The above description is intended to be illustrative, and not restrictive. For example, the above-described examples (or one or more Examples thereof) may be used in combination with each other. Other embodiments may be used, such as by one of ordinary skill in the art upon reviewing the above description.

What is claimed is:

1. An apparatus for moving a carriage along a rail, comprising:
    a frame having a first set of teeth and a second set of teeth,
    a shuttle including a third set of teeth that are configured to engage with the carriage to translate the carriage in a first direction with respect to the frame when the carriage is engaged with the third set of teeth, wherein the carriage is configured to move a container suspended from the carriage; and
    wherein the first set of teeth, the second set of teeth, and the third set of teeth each include a tooth having a holding configuration and a disengaged configuration, wherein:
    in the holding configuration, the tooth extends into a carriage recess of the frame and a holding face of the tooth is configured to inhibit the translation of the carriage within the carriage recess in a second direction, wherein the first set of teeth are biased toward the holding configuration to maintain engagement with the carriage until a force is applied to transition to the disengaged configuration, and wherein the tooth is configured as a sacrificial wear item that wears when the tooth engages with the carriage to decrease wear on the carriage; and
    in the disengaged configuration, the tooth allows the carriage to translate within the carriage recess in the first direction.

2. The apparatus of claim 1, wherein:
    translation of the shuttle in the first direction is configured to transport the carriage from engagement with the first set of the teeth to engagement with the second set of teeth, and
    the shuttle is configured to translate in the second direction while the carriage is engaged with the second set of teeth.

3. The apparatus of claim 2, wherein:
    the frame includes a fourth set of teeth; and
    translation of the shuttle in the first direction is configured to transport the carriage from engagement with the second set of the teeth to a location beyond the fourth set of teeth.

4. The apparatus of claim 3, wherein:
    the shuttle includes a fifth set of teeth, and the shuttle is configured to transport the carriage in the first direction when the carriage is engaged with the fifth set of teeth and the shuttle is translated in the first direction.

5. The apparatus of claim 4, wherein the shuttle is configured to translate in the second direction to locate the fifth set of teeth between the first set of teeth and the second set of teeth when the carriage is engaged with the second set of teeth.

6. The apparatus of claim 1, wherein:
    the third set of teeth are moveable between a holding configuration and a disengaged configuration, wherein:
    in the holding configuration the third set of teeth are configured to engage with the carriage to inhibit movement of the carriage in the second direction, and
    in the disengaged configuration, the third set of teeth are configured to:
    allow the shuttle to translate with respect to the carriage, and
    allow the shuttle to translate in the second direction; and
    wherein the third set of teeth are biased toward the holding configuration.

7. The apparatus of claim 1, wherein:
    individual ones of the third set of teeth are configured to pivot about respective tooth axes, and
    pivoting of the third set of teeth about the tooth axes allows the carriage to translate in the first direction with respect to the tooth axes.

8. The apparatus of claim 1, further comprising:
    a guide coupled with the frame;
    at least one guide block coupled with the shuttle; and wherein the guide is configured to slidingly engage with the guide block.

9. The apparatus of claim 1, further comprising at least one actuator coupled to the shuttle, wherein operation of the actuator is configured to translate the shuttle with respect to the frame.

10. A method for moving items along a rail, comprising:
receiving a carriage within a carriage recess defined by a frame of a carriage transporting apparatus, wherein the carriage is configured to move a container suspended from the carriage;
engaging the carriage with a first set of teeth, wherein the first set of teeth are coupled to a shuttle of the carriage transporting apparatus and are biased toward a holding configuration to maintain engagement with the carriage until a force is applied to transition to a disengaged configuration, and wherein at least one of the first set of teeth is configured as a sacrificial wear item;
operating an actuator, wherein operation of the actuator is configured translate the shuttle with respect to the frame;
moving the carriage along a rail, wherein the carriage is incrementally moved along the rail;
holding the carriage with a second set of teeth; and
engaging the carriage with a third set of teeth.

11. The method of claim 10, further comprising ejecting the carriage from the carriage transporting apparatus.

12. The method of claim 10, wherein incrementally moving the carriage along the rail includes transferring the carriage from a first station to a second station, wherein the second set of teeth are configured to hold the carriage at the second station.

13. The method of claim 10, wherein the carriage is a first carriage and operating the actuator includes translating an actuator rod with respect to an actuator housing, wherein:
a first end of the actuator rod is coupled with the first shuttle,
a second end of the actuator rod is coupled with a second shuttle; and
translation of the actuator correspondingly moves the first shuttle and the second shuttle with respect to the frame.

14. The method of claim 10, wherein the shuttle is a first shuttle, and further comprising:
transferring the carriage from the first shuttle to a second shuttle.

15. The method of claim 14, wherein transferring the carriage from the first shuttle to the second shuttle includes:
transferring the carriage from a first station to a second station with the first carriage;
transferring the carriage from the second station to a third station.

* * * * *